(12) United States Patent
Todt et al.

(10) Patent No.: US 9,718,998 B2
(45) Date of Patent: Aug. 1, 2017

(54) ADHESIVE COMPOSITION AND METHOD

(71) Applicant: Transhield, Inc., Elkhart, IN (US)

(72) Inventors: Gregory L. Todt, Union, MI (US); Seckin Ozol, South Bend, IN (US)

(73) Assignee: TRANSHIELD, INC., Elkhart, IN (US)

( * ) Notice: Subject to any disclaimer, the term of this patent is extended or adjusted under 35 U.S.C. 154(b) by 188 days.

(21) Appl. No.: 14/503,842

(22) Filed: Oct. 1, 2014

(65) Prior Publication Data
US 2015/0018461 A1   Jan. 15, 2015

Related U.S. Application Data

(60) Division of application No. 12/993,272, filed as application No. PCT/US2009/044686 on May 20,
(Continued)

(51) Int. Cl.
| | |
|---|---|
| *C08K 13/02* | (2006.01) |
| *C09J 153/00* | (2006.01) |
| *B32B 27/12* | (2006.01) |
| *C09J 7/02* | (2006.01) |
| *C09J 7/04* | (2006.01) |
| *B01F 7/00* | (2006.01) |
| *C09J 11/04* | (2006.01) |
| *C09J 11/06* | (2006.01) |
| *B32B 5/02* | (2006.01) |
| *B32B 5/22* | (2006.01) |
| *B32B 5/26* | (2006.01) |
| *B32B 7/12* | (2006.01) |
| *B32B 25/08* | (2006.01) |
| *B32B 25/10* | (2006.01) |
| *B32B 25/14* | (2006.01) |
| *B32B 27/08* | (2006.01) |
| *B32B 27/18* | (2006.01) |
| *B32B 27/20* | (2006.01) |
| *B32B 27/30* | (2006.01) |

(Continued)

(52) U.S. Cl.
CPC ....... *C09J 153/005* (2013.01); *B01F 7/00883* (2013.01); *B29B 7/60* (2013.01); *B29B 7/88* (2013.01); *B32B 5/022* (2013.01); *B32B 5/024* (2013.01); *B32B 5/22* (2013.01); *B32B 5/26* (2013.01); *B32B 7/12* (2013.01); *B32B 25/08* (2013.01); *B32B 25/10* (2013.01); *B32B 25/14* (2013.01); *B32B 27/08* (2013.01); *B32B 27/12* (2013.01); *B32B 27/18* (2013.01); *B32B 27/20* (2013.01); *B32B 27/302* (2013.01); *B32B 27/306* (2013.01); *B32B 27/32* (2013.01); *C08K 13/02* (2013.01); *C09J 7/0221* (2013.01); *C09J 7/045* (2013.01); *C09J 11/04* (2013.01); *C09J 11/06* (2013.01); *C09J 153/00* (2013.01); *B01F 2215/006* (2013.01); *B29B 7/46* (2013.01); *B29B 7/603* (2013.01); *B29B 7/72* (2013.01); *B32B 2262/02* (2013.01); *B32B 2262/0261* (2013.01); *B32B 2262/0276* (2013.01); *B32B 2262/06* (2013.01); *B32B 2262/067* (2013.01); *B32B 2262/08* (2013.01); *B32B 2264/00* (2013.01); *B32B 2264/02* (2013.01); *B32B 2264/104* (2013.01); *B32B 2264/12* (2013.01); *B32B 2307/54* (2013.01); *B32B 2307/5825* (2013.01); *B32B 2307/702* (2013.01); *B32B 2307/704* (2013.01); *B32B 2307/714* (2013.01); *B32B 2307/7145* (2013.01); *B32B 2307/724* (2013.01); *B32B 2307/7246* (2013.01); *B32B 2307/736* (2013.01); *B32B 2405/00* (2013.01); *B32B 2605/00* (2013.01); *C08K 5/0025* (2013.01); *C08K 5/057* (2013.01); *C09J 2205/102* (2013.01); *C09J 2400/263* (2013.01); *C09J 2453/00* (2013.01); *Y10T 428/28* (2015.01); *Y10T 442/2738* (2015.04)

(58) Field of Classification Search
CPC .. C08K 13/02; C09J 11/04; C09J 11/06; C09J 153/00; B01F 7/00883; B01F 2215/006
See application file for complete search history.

(56) References Cited

U.S. PATENT DOCUMENTS

| | | | |
|---|---|---|---|
| 5,705,566 | A | 1/1998 | Todt |
| 5,736,231 | A | 4/1998 | Todt |

(Continued)

FOREIGN PATENT DOCUMENTS

| | | |
|---|---|---|
| EP | 0825019 A2 | 2/1998 |
| JP | 56121670 A | 9/1981 |

(Continued)

*Primary Examiner* — Peter D Mulcahy
(74) *Attorney, Agent, or Firm* — Faegre Baker Daniels LLP

(57) ABSTRACT

An adhesive composition contains a block copolymer hot melt adhesive and a vapor releasing vapor corrosion inhibitor mixed with the block copolymer hot melt adhesive, the vapor corrosion inhibitor being in the form of particles suspended in the adhesive composition, the particles preferably having a maximum dimension of less than about 30 microns. One improvement results from inclusion in the adhesive mixture of a titanium and/or zirconium containing coupling agent, either separately or as part of the VCI particles. Another improvement results from blending the adhesive mixture in a continuous process using for example a twin screw extruder. As a result, the adhesive mixture has better uniformity and superior viscosity properties during use.

23 Claims, 8 Drawing Sheets

Related U.S. Application Data

2009, now abandoned, which is a continuation of application No. PCT/US2009/030541, filed on Jan. 9, 2009.

(60) Provisional application No. 61/054,728, filed on May 20, 2008.

(51) Int. Cl.
| | | |
|---|---|---|
| *B32B 27/32* | (2006.01) | |
| *B29B 7/60* | (2006.01) | |
| *B29B 7/88* | (2006.01) | |
| *C08K 5/057* | (2006.01) | |
| *C08K 5/00* | (2006.01) | |
| *B29B 7/46* | (2006.01) | |
| *B29B 7/72* | (2006.01) | |

(56) References Cited

U.S. PATENT DOCUMENTS

| | | |
|---|---|---|
| 6,339,121 B1 | 1/2002 | Rafailovich et al. |
| 6,866,411 B1 * | 3/2005 | Stelzer .................... B01F 5/104 366/136 |
| 7,160,949 B2 | 1/2007 | Ota et al. |
| 7,199,180 B1 | 4/2007 | Simmons et al. |
| 2008/0015278 A1 | 1/2008 | Malik et al. |

FOREIGN PATENT DOCUMENTS

| | | |
|---|---|---|
| KR | 10-0809266 B1 | 3/2008 |
| WO | WO 2005059188 A2 | 6/2005 |
| WO | WO 2007037517 A1 | 4/2007 |

\* cited by examiner

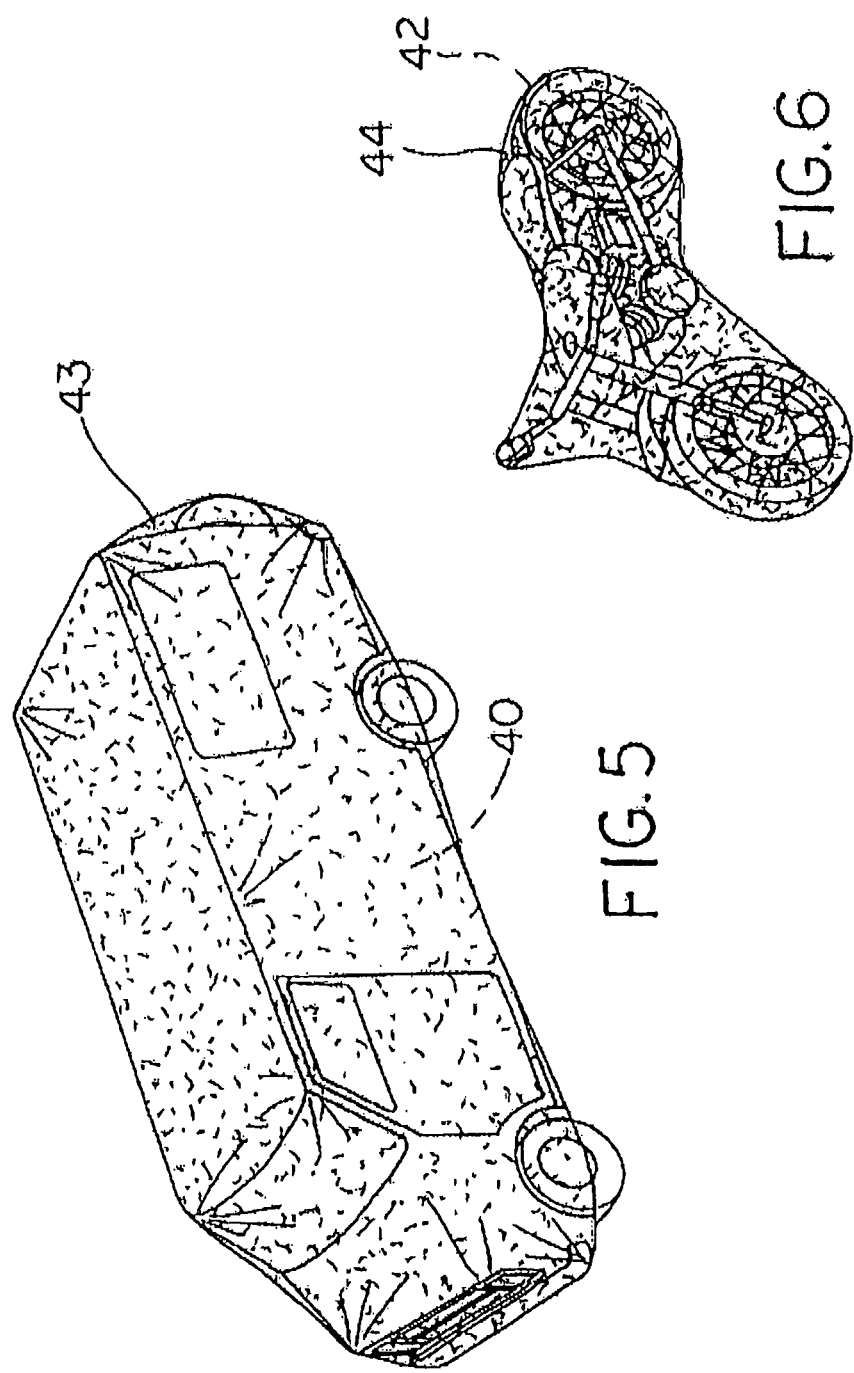

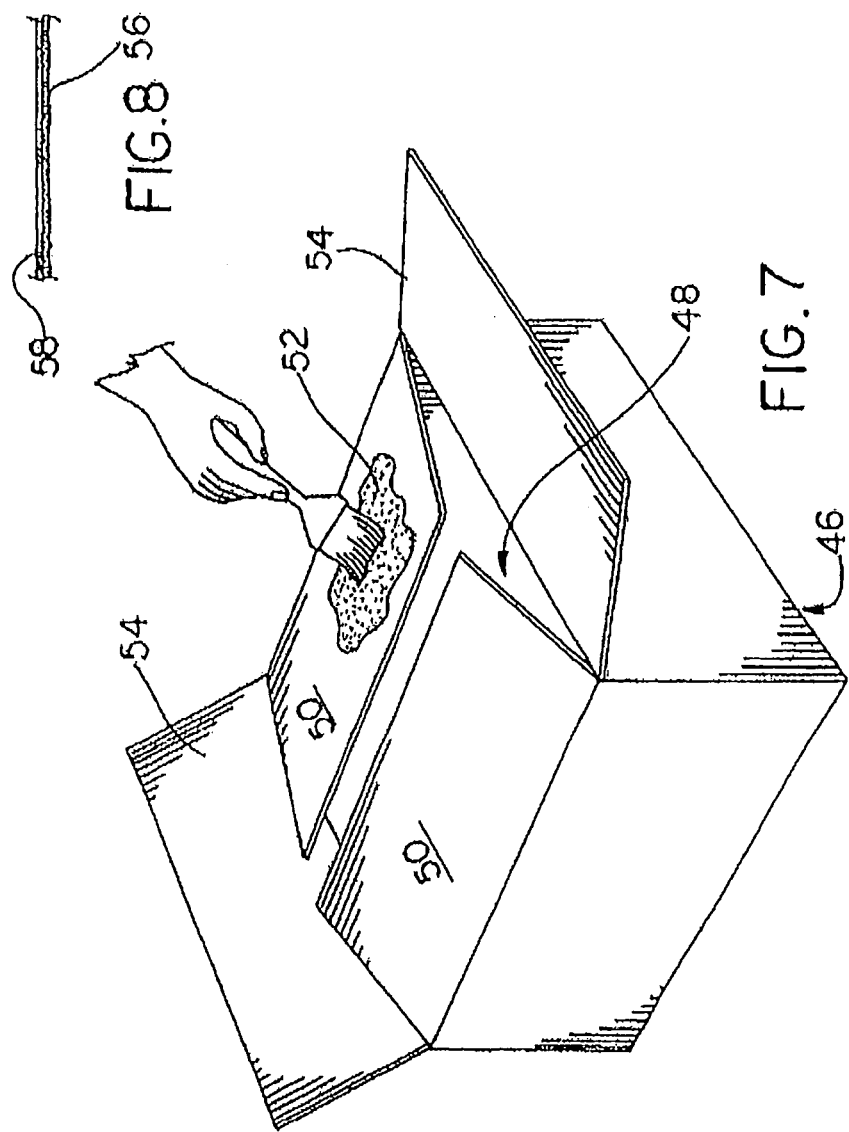

ADHESIVE COMPOSITION AND METHOD

CROSS-REFERENCE TO RELATED APPLICATIONS

This application is a divisional application of U.S. patent application Ser. No. 12/993,272 filed Nov. 18, 2010, which is a National Stage of International Application No. PCT/US2009/044686, filed May 20, 2009, which is a continuation of PCT International Application No. PCT/US2009/030541, filed Jan. 9, 2009, now withdrawn, which claims the benefit of U.S. Provisional Application No. 61/054,728, filed on May 20, 2008. The entire disclosures of each of the above applications are incorporated herein by reference.

INTRODUCTION

This invention relates to an adhesive containing a corrosion protective additive and a wrap material for wrapping products which uses the adhesive. The adhesive may include, for example, a vapor corrosion inhibitor (VCI) that reacts with moisture enclosed within the wrapping material to protect the products from corrosion.

Corrosion is a natural occurring process that causes metals to react with their environment to form more stable compounds. The cost of corrosion on metals has been estimated as about 4.9% of the GNP of an industrialized nation.

In the military and in the transportation industry, vehicles used on ground, on air or in the sea, and the equipment placed on these vehicles are subject to corrosion as a consequence of their operational, storage or shipping environments. Automobiles, automobile parts and other metallic industrial articles being shipped or stored are also subject to corrosion due to their environment.

To reduce corrosion and its attendant costs, vapor corrosion inhibitors (VCI's) have been studied since early 1900's, and their popularity in use increased during WWII. The commercial formulations of VCI's tend to be held as proprietary by VCI suppliers, but they generally contain low molecular weight amines or mixtures of amines. In many applications of VCI's the amines are volatile enough to vaporize from their carrier and create a protective layer of film, only a few molecules thick, on metal surfaces. The protective layer of film blocks or retards the amount of electron activity on the metallic surface from reaction with water molecules and helps protect the surface. When VCI's are contained in a closed environment, as a box or room, they build a relatively low vapor pressure around the articles enclosed.

Vapor corrosion inhibitors have been integrated into films, tapes, paper and other carrier products for different packaging applications and the effectiveness of VCI's for corrosion control has been studied over the years.

Technology to address industrial corrosion is provided in U.S. Pat. No. 5,705,566 and U.S. Pat. No. 5,736,231, the disclosures of which are useful as background and are incorporated herein by reference. The patents describe a laminated product designed to shrink over the articles being protected during storage and transportation of boats, vehicles and any other product with a finished surface. The product is created by laminating a shrink/stretch film with high tensile and tear properties to a hydro-entangled nonwoven using a hot-melt adhesive that contains a VCI.

The film provides protection against physical damages, and is inert to a lot of chemistries. The film provides necessary tear and tensile strength to the overall material. Tear propagation strength is important during transportation, because even if the cover receives a puncture or a hole, it should not propagate or cause any damage to the product. Tensile strength is specifically important for objects that have void areas, such as for example odd-shaped industrial products and boats. Any force applying over a void can cause the cover to sag, or deform.

Polyethylene film, with its low water vapor transmission rate (WVTR), is designed to keep moisture away from the product being covered. Since the polyethylene film is treated to 40+ dynes for lamination on one side and the outer skin side is still at the natural 32 dyne level the water vapor tends to move from inside to outside layer of the film due to difference in the surface energy. Keeping the relative humidity at or below the 30% rate is the preferred environment for protecting against atmospheric corrosion.

Dew and condensation are undesirable from a corrosion standpoint and the nonwoven, by its wicking properties, helps remove the condensation away from the surface and pulls it towards the film. The nonwoven also provides a soft surface for the article being protected. Boats, automobiles and other industrial materials with paint coatings are kept in pristine condition and the chance of scratches on the painted surfaces are lowered or eliminated.

Depending on the application, there can be 4 to 15 g/m.sup.2 of hot-melt adhesive laminating the shrink/stretch film to the nonwoven. At these levels, the nonwoven tends to release from the shrink film, and this release creates small air bubbles between the nonwoven and the shrink film when the covers are being shrunk.

Shrinking an article being transported or stored provides multiple advantages for the user. On large equipment or automobiles shrinking the cover provides flawless fit, ensuring that the cover will not come off. This is a safety issue for other vehicles on the road as well as the owner of the product being covered. The tight fit provides an aerodynamic final look, even on oddly shaped products, and this improves the fuel efficiency of the vehicle carrying the products. Another advantage of a shrunk cover is that it provides tamper resistance. If someone tried to break in to the product, they would have to damage the shrunk cover first, to get to the product, and most of the time this serves as a deterrent.

SUMMARY

An adhesive composition contains a block copolymer hot melt adhesive and a vapor releasing vapor corrosion inhibitor or multiple corrosion inhibitors mixed with the block copolymer hot melt adhesive, the vapor corrosion inhibitor(s) being in the form of particles suspended, dispersed, mixed, or otherwise incorporated in the adhesive composition, the particles preferably having a maximum dimension of less than about 30 microns and having preferred dimensions of 3 to 10 microns. One improvement results from inclusion in the adhesive mixture of a titanium and/or zirconium containing coupling agent, either separately or as part of the VCI particles. Another improvement results from blending the adhesive mixture in a continuous process using for example a twin screw extruder. As a result, the adhesive mixture has better uniformity and superior viscosity properties as well as improved corrosion inhibition.

The improved adhesive mixture can be used in a material for protecting products and in a material for shrink wrapping articles. A material for protecting products comprises a film having opposite sides and a hot melt adhesive applied to one side of the film. The adhesive mixture has particles of a vapor corrosion inhibitor mixed in the adhesive, the vapor corrosion inhibitor emitting a corrosion inhibiting vapor protecting a wrapped product from corrosion. In one embodiment, the film is impermeable to the vapor emitted by said vapor corrosion inhibitor. The adhesive secures a nonwoven fabric to the film, the nonwoven fabric being readily permeable to the vapor emitted by the vapor corrosion inhibitor.

Tape products and other composite articles are provided that contain a substrate in sheet form with the improved adhesive composition applied to at least one side of the substrate.

A material for shrink wrapping an article contains a shrinkable, stretchable film outer layer having a predetermined shrink response to energy such as heat energy applied to the film, and a fabric inner layer, for example a nonwoven fabric. A hot melt adhesive secures the fabric inner layer to the outer layer, and contains a protective vapor releasing additive. When an article is wrapped with the fabric side toward the article, the additive releases a protective vapor, passes through the nonwoven fabric for treating the article and preventing corrosion.

BRIEF DESCRIPTION OF THE DRAWINGS

FIGS. 5 and 6 are views in perspective of a conversion van and a motorcycle respectively which have been wrapped with a material made pursuant to the present invention.

FIG. 7 is a view in perspective of a box container which utilizes the present invention to protect products contained therein.

FIG. 8 shows a cross-sectional view of the adhesive layer applied to one side of a film.

DETAILED DESCRIPTION

Figure 1:
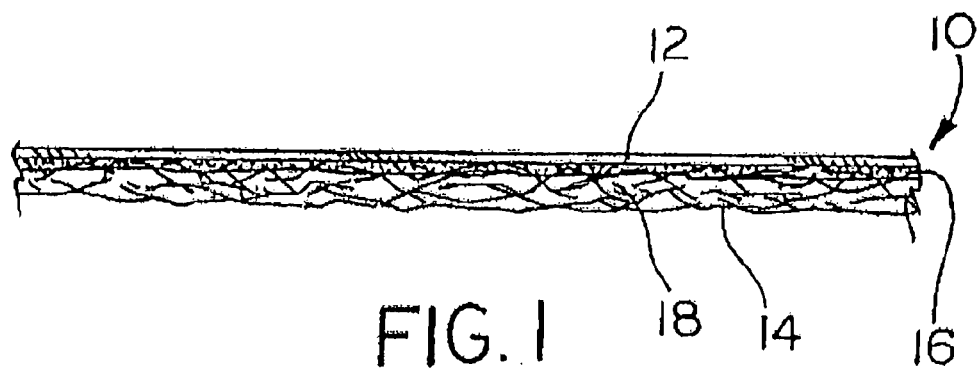
FIG. 1 is a cross-sectional view taken through the wrapping material according to the present invention before the material is shrunk around an article.

In various aspects, the current teachings describe a further development of technology disclosed in commonly owned U.S. Pat. No. 5,736,231 and U.S. Pat. No. 5,705,566. In those patents, an adhesive additive delivery system is described for use in a protective wrap. Various further aspects of the adhesive mixture, its manufacture, and use are described herein.

In various embodiments, the adhesive mixture is used to bond films to fabrics to provide useful wrapping and/or protective articles. The films can be made of polymers or other materials and can have shrink or stretch properties, depending on the application. The fabrics can be woven or nonwoven and made from a variety of materials depending on the application.

In one aspect, an adhesive mixture comprises a block copolymer hot melt adhesive and a vapor releasing vapor corrosion inhibitor mixed with the block copolymer hot melt adhesive. In various embodiments, the vapor corrosion inhibitor is in the form of particles in the adhesive composition. In some embodiments, the vapor phase corrosion inhibitor is dispersed into the adhesive on a molecular level; or is present partially as particles and partially on a molecular level. The particles preferably have a maximum dimension of less than about 30 microns, to provide a fine dispersion. In various embodiments particles have a size from about 3 to about 10 microns. In the current teachings, the adhesive mixture further comprises titanate, zirconate, or silane coupling agents. The adhesive mixture can be produced advantageously in a continuous process using twin screw technology that permits incorporation of the coupling agent into the adhesive mixture to achieve dispersion into the adhesive mixture and a highly reproducible product with useful viscosity and flow properties.

In another aspect, a material for protecting products comprises a film having opposite sides, a hot melt adhesive applied to one side of the film, and a fabric, for example a nonwoven fabric, bound by the adhesive to that side of the film. In various embodiments, the hot melt adhesive is as further described herein. The adhesive containing the vapor corrosion inhibitor emits a corrosion inhibiting vapor that protects the product from corrosion. The film is impermeable to the vapor emitted by the vapor corrosion inhibitor, while the nonwoven fabric is readily permeable to the vapor. The adhesive secures the nonwoven fabric to the film. In developments described herein, the adhesive contains titanate, zirconate, or silane coupling agents in addition to the vapor phase corrosion inhibitors and is produced in a continuous process. In a preferred embodiment, the adhesive is applied intermittently to secure the film to the fabric.

In another aspect, the current teachings describe an advance in a material for shrink wrapping articles, based on the same improvement in an adhesive formulation. The shrink wrapping material has a shrinkable, stretchable film outer layer having a predetermined shrink response in response to heat applied to the film, a nonwoven fabric inner layer, and a hot melt adhesive securing the inner layer to the outer layer. The adhesive has an additive that releases a protective vapor that upon release passes through the nonwoven fabric (but not through the outer film) for treating and protecting articles wrapped by the material.

Further developments in packaging are also encompassed, based on the advances in adhesive compositions described herein. In one aspect, a packaging defines a volume for containing a product, the packaging comprising an inner layer and an outer layer, a hot melt adhesive securing the inner layer to the outer layer, and a vapor releasing additive in the adhesive releasing a vapor into the volume for creating a protecting atmosphere within the volume. The outer layer is a flexible film and the inner layer is a nonwoven fabric, with the adhesive securing one side of the nonwoven fabric to a facing side of the film, and the vapor being released from the adhesive through the nonwoven fabric and into the volume.

In one embodiment, the invention provides an adhesive composition that contains a thermoplastic block copolymer adhesive, a vapor phase corrosion inhibitor or a combination or mixture of vapor phase corrosion inhibitors, and at least one of an organotitanate compound and an organozirconate compound. The organotitanate and/or organozirconate compound serve as a coupling agent, and in various embodiments are believed to be located at least in part on the surface of powder particles present in the composition. The powder, which is made up of one or more vapor phase corrosion inhibitors, for example at a total level of about 0.01% to about 15% by weight of the adhesive is dispersed in the thermoplastic block copolymer adhesive. In various embodiments, the particles dispersed in the adhesive have an average diameter less than 30 .mu.m, or a maximum diameter less than 30 .mu.m.

In various embodiments, the adhesive compositions contain organotitanate and/or organozirconate compounds at a total level to provide the overall adhesive composition with 0.01% to 0.5% by weight of total titanium and zirconium, measured on an elemental basis. The adhesive composition optionally and preferably contains other ingredients such as one or more of a tackifying resin, an antimicrobial agent, a coloring agent, and the like.

In a specific embodiment, a hot melt adhesive composition contains a thermoplastic copolymer adhesive, powder particles made up of vapor phase corrosion inhibiting chemistry, and a titanate functional coupling agent and/or a zirconate functional coupling agent. In various embodiments, at least some of the powder particles consist of a chemical compound or mixture of compounds that provide the adhesive with vapor phase corrosion protection in that corrosion protective chemical species are released during use of the wrapping material described herein. The composition preferably contains from about 0.01% to about 0.5% by weight of total titanium and zirconium measured on an elemental basis. In preferred embodiments, the powder particles have an average dimension less than 30. mu.m. The copolymer adhesive is a multiblock copolymer containing two or more blocks differing in one or more physical or chemical properties. In a non-limiting embodiment, the blocks are made by polymerizing ethylene and at least one copolymerizable monomer. Representative copolymerizable monomers are C.sub.3-20 and C.sub.4-20 olefins.

In various embodiments, the invention provides composite products made of a substrate in sheet form and an adhesive as described herein applied on at least one side of the substrate. In various embodiments, adhesive is disposed on at least one side of a substrate to provide tape materials or other composite articles. In various embodiments, the substrate is a polymer film, a nonwoven fabric, or a woven fabric.

In one embodiment, a composite article in the form of a sheet and containing the hot melt adhesive is made of a film laminated or bonded to a nonwoven fabric, with adhesive compositions described herein as the interface between the film and the nonwoven fabric. According to various aspects, an additive is added to a hot melt adhesive used to secure a nonwoven fabric to a film, such as a shrink film, a stretch film, or a shrink/stretch film by way of non-limiting example, to produce a wrap material used to protect articles. The additive releases a vapor into a package enclosed by the wrap material. The vapor mixes with the air enclosed within the package and any other vapors (such as moisture) in the cavity being protected. The vapor condenses on the surface of the product being protected and forms a thin, but highly effective, corrosion prohibiting layer or atmosphere. Should additional moisture enter the enclosed cavity, the vapor released by the additive forms it into a noncorrosive vapor. Furthermore, the film outer layer acts as a barrier preventing emission of the inhibitor into the atmosphere. Accordingly, the packaging material according to the present invention is a "one way" emitter, in which, all of the additive is used to treat the product used with the material, and the additive is not emitted into the ambient atmosphere.

In other embodiments, methods of manufacturing hot melt adhesive compositions are provided. In preferred embodiments, the methods are carried out in a continuous process, for example in a twin screw extruder apparatus.

In one embodiment, a method of manufacturing a hot melt adhesive composition in multiple stages is provided. In a first stage, the method involves subjecting a hot melt adhesive to a first temperature above 120.degree. C. while blending (stirring) at a first shear rate to melt the adhesive. The first stage provides a molten adhesive with sufficient flow parameters for further processing in later stages. The method further involves, in a second stage, increasing the shear to a second shear rate and reducing the temperature below 120.degree. C., preferably below 100.degree. C., and more preferably below 90.degree. C. The adhesive is shear sensitive so that increasing the shear rate reduces the viscosity to such an extent that suitable low viscosity can be maintained in the second stage even at a lower temperature. In a third stage, the method involves adding vapor corrosion inhibiting chemistry in powder format, to the adhesive while maintaining sufficient shear to maintain the temperature below 120.degree. C., preferably below 105.degree. C., preferably below 100.degree. C., and more preferably below 90.degree. C. Sufficient shear is maintained to provide adequate melt flow. The sheared mixture is subjected to mixing at the temperature for sufficient time to disperse the powder in the adhesive. Advantageously, the temperature of mixing is at a suitably low temperature while proper mixing and/or flow is maintained from the applied shear. The powder contains one or more chemical species or compounds that are classified as vapor corrosion inhibitors. The temperature in the third and subsequent stages is preferably kept below a temperature at which the vapor phase corrosion inhibitor is lost or volatilized from the composition, and below a temperature at which the titanate or zirconate coupling agent is decomposed or otherwise rendered less effective. In some embodiments, this temperature is 105.degree. C. or less. In a fourth stage, the method optionally and preferably provides for adding a tackifying agent to the adhesive composition containing dispersed VCI particles. The fourth stage addition of tackifying agent is carried at a suitably low temperature for a short time at a relatively low shear rate, for best incorporation into the adhesive to develop the best tack for further application in inline lamination processes or other uses. One or more additional components of an adhesive composition such as without limitation an optical brightener, a coloring agent, and an antimicrobial composition can be added into the adhesive in any of the stages noted.

In another advance over known methods, the method in various embodiments further involves adding a coupling agent in the third stage along with the VCI particles. In various embodiments, the coupling agent is selected from organotitanate compounds (also called "titanates"), organozirconate compounds (also called "zirconates"), and silane compounds. Mixtures of coupling agents can also be used. In various embodiments, a coupling agent selected from titanates and zirconates is combined with the VCI particles ahead of time before the so-called "titanated" (or "zirconated") VCI particle is mixed into the adhesive in the third stage. In other embodiments, the coupling agent is fed into the adhesive separately from the VCI particles, and can be added at the same zone as the VCI or in zones upstream or downstream of the VCI addition. Advantageously, the relatively low temperature and high shear of the third stage provide for efficient mixing or exfoliation of the coupling agent in the adhesive/VCI mixture.

Advantages are provided in the methods by controlling the temperature in various stages of the process. For example, it is preferred to operate at a temperature above the melting point of the adhesive in the first stage, for example at a temperature of about 125.degree. C. to about 150.degree. C. In the fourth stage, it is preferred not to operate at too high a temperature in order to avoid possible volatilization of the vapor phase corrosion inhibitor, while at the same time operating at a high enough temperature to facilitate compounding of optional ingredients such as the tackifying resins and others. In a preferred embodiment, the method is carried out at a temperature of about 120.degree. C. to about 130.degree. C. in the fourth stage.

The third stage, involving adding the vapor corrosion inhibitor in powder form to the adhesive and maintaining sufficient shear to disperse the powder, is carried out at low temperature relative to the melting point of the adhesive. In preferred embodiments, the temperature in the third stage of mixing the powder is 100.degree. C. or less, preferably at 90.degree. C. or less. In various embodiments, the temperature during the third stage of adding the powder and mixing the powder into the adhesive is 80.degree. C. or less. It is to be understood that when the temperature is 100.degree. C. or less, 80.degree. C. or less, and the like, that the temperature is also maintained sufficiently high to achieve acceptable melt flow. For this, the temperature is preferably maintained at 50.degree. C. or higher, preferably at least 60.degree. C. or at least 70.degree. C. Flow is maintained at the lower temperatures by increasing the shear, for example in a twin screw apparatus, whereupon the pseudoplastic or shear sensitive adhesive material is reduced in viscosity.

Continuous versions of the processes described herein can be implemented in extrusion apparatus. Operation of screws in an extrusion apparatus provides for mixing and transport of the composition while it is being compounded in various zones or stages that occur at various places along the barrel of the extruder. Single screw extrusion apparatus can be used, but it is generally preferred to use a multiple screw extruder such as a twin screw extruder to achieve the most efficient mixing and compounding of the adhesives. Co-rotating screws (intermeshed or not) are commonly used for such compounding. For general background on extrusion, attention is directed to the Plastics Engineering Handbook, Fifth Edition, edited by Michael L. Berins and published by the Society of the Plastics Industry, Inc., for example at page 91ff.

In a particular embodiment, a method of compounding an adhesive composition in an extruder such as a twin screw extruder is provided. In one aspect, this involves implementation of the various stages of a continuous process in a twin screw extruder apparatus. The method involves melting a hot melt adhesive and introducing the molten hot melt adhesive into the barrel of the extruder. The hot melt adhesive is preferably a thermoplastic block copolymer. After introduction into the barrel, the melt is cooled below 90.degree. C. while increasing the shear in the barrel to maintain sufficient melt flow. When the lower temperature of 90.degree. C. or less is reached, a titanate and/or zirconate coupling agent is added to the melt at a temperature of 90.degree. C. or below. Also at a temperature of 90.degree. C. or lower, a vapor corrosion inhibitor is added to the melt in particulate form. Alternatively, the VCI particles added in the third stage are pre-coated with the titanate or zirconate coupling agent. The blend of a hot melt adhesive, vapor corrosion inhibitor, and titanate and/or zirconate coupling agent is then blended at a temperature of 90.degree. C. or less (in various embodiments, at 80.degree. C. or less) until the particles are dispersed in the hot melt adhesive. The vapor corrosion inhibitor in particulate form is preferably made up of a mixture of inhibitors to provide multi-metal protection, by way of non-limiting example.

As noted, it is desirable to maintain the temperature below 90.degree. C. during the blending of the coupling agent, the adhesive, and the vapor corrosion inhibitor in particulate form. In representative embodiments, the temperature is maintained at a temperature of about 50.degree. C. to 80.degree. C. Thus, in various embodiments, the methods involve adding a titanate or zirconate coupling agent to the melt at a temperature of 50.degree. C. to 80.degree. C. and blending the adhesive, the vapor corrosion inhibitor, and the coupling agent at a temperature from 50.degree. C. to 80.degree. C.

Melting the adhesive is preferably carried out at a temperature of 120.degree. C. to 160.degree. C.

After low temperature blending and dispersing of the vapor corrosion inhibitor in particulate form into the melt in the presence of the coupling agents, the temperature can be raised if desired to add further components. In a non-limiting example, after the particles are dispersed in the hot melt adhesive, the process involves continuing to provide shear at a temperature of 80.degree. C. to 130.degree. C. and adding other components. Non-limiting examples of further components include tackifying agents, coloring agents, and antimicrobial composition.

It is preferred to add the coupling agents during the process at a level to provide a total level of titanium and zirconium at a level of 0.05% to 5% or 0.1% to 5% by weight on an elemental basis.

The coupling agent and the vapor corrosion inhibitor (VCI) particles can be added into the screw extruder in separate additions, or as a single addition. Thus, in one embodiment, the VCI and the coupling agent are added separately. In another embodiment, the coupling agent and the VCI are added together into the extruder. In a particular embodiment, the VCI and the coupling agent are first combined in a separate step, with the combination then being added to the melt in the extruder, preferably at a temperature below 90.degree. C. It is believed that by combining the coupling agent and VCI particles, the organotitanate or organozirconate coupling agent is substantially disposed on the surface of the VCI particles. Advantageously, the extruder process and other processes described herein involve blending or exfoliating the VCI powder particles at low temperatures to provide efficient dispersion of the particles in the adhesive, while at the same time avoiding high temperatures that would degrade the quality of the particles and/or lead to premature volatilization of the corrosion inhibitors from the composition.

When the continuous process is implemented in an extrusion apparatus, the temperature and shear conditions in the respective extruder zones during the first, second, third and fourth stages are achieved and controlled using known techniques in the extrusion field. Temperature, for example can be controlled with heating jackets placed along the length of the extruder in conventional fashion. The shear conditions and the amount and rate of mixing in the stages can be accomplished by selecting suitable screw designs and operating conditions in various zones of the extruder. Shear can be determined by the design of the screw threads including pitch, height, distance peak to peak. It can also be obtained by selecting screw parameters such as speed, counter-rotation (for twin screw extruders), and the like. The degree of mixing and shear is also a function of screw design and operation parameters. The time of mixing in each of the stages is determined by such parameters as screw speed, design of the screws, and length of the extruder in which the individual steps or stages are carried out. Relative mixing and retention times in each of the stages is determined in part by the length of barrel (corresponding to various "zones" of the extruder) in which the noted screw design and operating conditions are implemented. Further description of extruder technology is provided in treatises such as Mixing and Compounding of Polymers, Manas-Zloczower et al., Eds. (Carl Hanser Verlag, 1994) and Functional Fillers for Plastics, Xanthos, ed. (Wiley, 2005), the disclosures of which are useful as background information and are hereby incorporated by reference.

It is preferred to add a tackifying agent, if needed, in a fourth stage that is carried out after the VCI and coupling agent are added to the adhesive. When the process is implemented in extruders, the fourth stage takes place in the extruder "downstream" of the third stage. When a tackifying agent is thus added, preferably it is added with a relatively low amount of shear and mixing compared to some of the other stages. One way to accomplish the low amount of mixing is to carry out the stage in a length of barrel that is short relative to other steps. In a non-limiting example, the fourth stage of adding a tackifying agent with low mixing is carried out at the end of the extrusion barrel just before exiting the extruder. The length of mixing in the fourth stage is determined by the length of the barrel in which the mixing takes place. To illustrate, the mixing in the fourth stage takes place in a zone that has a length from 5% of the total barrel length to 25% of the total barrel length. This provides for a relatively short mixing time, which is preferred for best development of tack from the tackifying agent. In addition, the shear conditions in the fourth stage are mild compared to some other stages. The amount of shear in the fourth stage (determined by screw parameters) and the residence time (determined by barrel length) can be varied to achieve optimum incorporation of the tackifying agent. It should be noted that since the starting adhesive is a pressure sensitive hot melt adhesive it can already contain tackifying agents; however addition of secondary tackifying agent after the corrosion inhibiting powder is mixed helps to improve initial tack during lamination process.

In various embodiments, advantages are achieved through advances in the adhesive used as described herein. The adhesive is part of an adhesive additive delivery system (AAD). The AAD system contains a vapor corrosion inhibitor (VCI) as described herein. Further aspects of the adhesive will now be described.

Adhesives

The adhesive polymer used to formulate the adhesive compositions is preferably of the hot melt type, and is especially selected from thermoplastic polymers and thermoplastic elastomers such as AB and ABA diblock and tri-block elastomers. Thermoplastic polymers used in the adhesive compositions provide cohesive strength to the final adhesive material and provide a medium for dissolution or suspension of the adhesive ingredients. Thus, the thermoplastic polymer tends to act as a vehicle exhibiting the properties provided by the adhesive components and cooperates with the adhesive components to provide the final adhesive properties.

Hot melt adhesives, by definition, are selected from thermoplastic polymers that are heated to obtain a liquid of flowable viscosity. After application, the adhesives are cooled to be essentially solid. In the use of such adhesives, normally two surfaces to be joined by the adhesive are bonded while the adhesive is still fluid. Upon cooling, the adhesive sets and joins the two materials.

One class of polymers for use in the adhesive compositions is the rubbery block copolymer such as those derived from vinyl aromatic monomers and other rubbery monomers. Vinyl aromatic monomers include styrene. Rubbery monomers include butylene, ethylene, isobutylene, butadiene, isoprene, and others. The polymers are preferably in the form of block copolymers such as AB or ABA polymers where A and B represent blocks of different compositions. In block copolymers having some unsaturation, the material can be hydrogenated to reduce or eliminate the unsaturation. Such compositions include butadiene styrene block copolymers, isoprene styrene block copolymers, styrene isoprene styrene block copolymers, styrene butadiene styrene block copolymers, styrene ethylene butadiene styrene block copolymers (SEBS), and the like. Suitable styrene Mock copolymers are commercially available, for example from Kraton under the KRATON trade name. The styrene blocks segregate into distinct domains of high Tg that function as physical crosslinks. The two-phase networks persist up to a temperature where the polymer becomes homogenous. The block copolymers are thus thermoplastic at some temperatures but upon cooling regain a two-phase morphology and elastomeric character. Because of this and because the low molecular weight of suitable thermoplastic elastomers gives compositions of suitably low viscosity, the materials are suitable as hot melt and pressure sensitive adhesives.

In some embodiments, the adhesive polymer has blocks based on ethylene homopolymers or ethylene copolymers. In preferred embodiments, the ethylene copolymers contain greater than 50 mol % ethylene units. In a particular embodiment, the adhesive is a tri-block ABA copolymer, wherein A is an ethylene homopolymer or copolymer block and where B is an ethylene copolymer block different from A. An example of a suitable adhesive includes an ABA tri-block copolymer, wherein A is a high density polyethylene (HDPE) block and B is a linear low density polyethylene (LLDPE) block.

In various embodiments, the thermoplastic adhesives are based on a segmented copolymer (or multi-block copolymer), wherein the copolymer contains two or more and preferably three or more segments or blocks differing in one or more chemical or physical properties. In an exemplary embodiment, the blocks are made from copolymerizing ethylene and at least one copolymerizable comonomer. Suitable segmented copolymers and methods of making them are described for example in Arriola et al., International Publication WO2005/090427, the disclosure of which is hereby incorporated by reference. Commercial embodiments of the so-called olefin block copolymers (OBC) are supplied by Dow Chemical under the INFUSE trade name. For example, grades D9817.15 and D9807.15 are suitable.

The use of olefin block co-polymers based on copolymers of ethylene and a copolymerizable monomer eliminates styrene from the adhesive. When the adhesive is used as further described herein to laminate a wrapping material for protecting surfaces, the use of the adhesive also eliminates styrene from the laminated product. Elimination of styrene from the adhesive can be beneficial in that it improves heat sealing of the laminated product, since the whole structure can be made of polyolefin materials. For example, when the base adhesive is made of polyethylene and its copolymers, it allows the whole wrapping material to be LDPE based if the nonwoven and the film are also based on LDPE. When this is achieved, the wrapping material can be readily heat sealed or ultrasonically sealed to itself. This in turn permits creating smaller wrapping materials in an efficient manner. An example is automatic bags, where a sheet of wrapping material can be folded into a bag shape and sealed onto itself to create a bag. Eliminating styrene from the adhesive and from the laminated products will also improve post consumer recyclability of the wrapping material, especially for the situation where the film, adhesive, and nonwoven are based on a single type of polymer such as polyolefin, polyethylene, or ethylene copolymers such as LDPE.

In various embodiments, the olefin block copolymers are multi-block copolymers, preferably linear multi-block copolymers of two or more monomers, more especially ethylene and a C.sub.3-20 olefin or cycloolefin, and most especially ethylene and a C.sub.4-20.alpha.-olefin. In another embodiment, the olefin block copolymers useful as adhesives in the compositions described herein are in the form of a segmented copolymer (or multi-block copolymer), especially such a copolymer comprising ethylene in polymerized form, the copolymer containing two or more and preferably three or more segments differing in comonomer content or density or other chemical or physical property. In exemplary embodiments, the copolymers can possess a molecular weight distribution or polydispersity M.sub.w/M.sub.n of less than 3.0, preferably less than 2.8. In various embodiments, the segmented polymers are ethylene multi-block copolymers.

The term "multi-block copolymer" or "segmented copolymer" as used in the adhesive compositions described herein, refers to a polymer comprising two or more chemically distinct regions or segments (referred to as "blocks"). The segments or blocks are preferably joined in a linear manner, that is, a polymer made up of chemically differentiated units joined end to end with respect to polymerized ethylenic functionality, rather than in pendant or grafted fashion. In various embodiments, the blocks differ in the amount or type of comonomer incorporated into the blocks, the density, the degree of crystallinity, the crystallite size attributable to a polymer of such composition, the type or degree of tacticity (isotactic or syndiotactic), regio—regularity or regio—irregularity, the amount of branching, the homogeneity, or any other chemical or physical property. Compared to other block copolymers, including copolymers produced by sequential monomer addition or anionic polymerization techniques, the olefin block copolymer useful as adhesives in the compositions of the invention are characterized by unique distributions of polydispersity (PDI or M.sub.w/M.sub.n), block length distribution, and/or block number distribution. More specifically, when produced in a continuous process, the polymers desirably possess PDI form 1.7 to 2.9, preferably from 1.8 to 2.5, more preferably from 1.8 to 2.2, and most preferably from 1.8 to 2.1. When produced in a batch, or a semi-batch process, the polymers desirably possess PDI from 1.0 to 2.9, preferably from 1.3 to 2.5, more preferably from 1.4 to 2.0, and most preferably from 1.4 to 1.8.

The olefin block copolymers can be referred to as an "ethylene multi-block copolymer." Such a term refers to a multi-block copolymer comprising ethylene and one or more copolymerizable comonomers, wherein ethylene comprises a plurality of the polymerized monomer units of at least one block or segment in the polymer, preferably 90% mol, more preferably at least 95% mol, and most preferably at least 98% mol of the block. Based on total polymer weight, the ethylene multi-block copolymers have a ethylene content from 25% to 97% by weight, preferably from 40% to 96% by weight, more preferably from 55% to 95% by weight, and most preferably from 65% to 85% by weight.

Suitable monomers for preparing the olefin block copolymers include ethylene and one or more copolymerizable monomers other than ethylene. Examples of suitable comonomers include straight chain or branched .alpha.-olefin of 3 to 30, preferably 3 to 20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. Others include cycloolefins of 3 to 30, preferably 3 to 20 carbon atoms, such as cyclopentene, cycloheptene, norbornene, 5-methyl-2-norbornene, tetracyclododecene, and the like. In various embodiments, the comonomers are chosen from di- and polyolefins such as butadiene, isoprene, 4-methyl-1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinylnorbornene, dicyclopentadiene, 7-methyl-1-6-octadiene, 4-ethylidene-8-methyl-1-7-nonadiene, and 5,9-dimethyl-1,4,8-decatriene.

As supplied commercially, many hot melt adhesives contain tackifying agents in addition to the noted block copolymers. Additional quantities of tackifying agents can be added to a later stage, as discussed herein.

VCI Particles

The adhesive compositions also contain vapor phase corrosion inhibitors (VCI). These are provided in powder format, and are dispersed in the adhesive polymer along with the coupling agents. In use, a VCI reaches the surfaces that it must protect from corrosion through the vapor phase. This transport mechanism requires that protective molecules be characterized by having a suitable vapor pressure. In an alternative, a VCI compound reacts with moisture or other system components to generate a volatile species with vapor phase corrosion inhibition properties. In one aspect, vapor phase corrosion inhibitors are volatile chemistries that can be adsorbed on the metal surface. The rate of adsorption of the volatile component and the temperature dependent vapor pressure affects the rate and level of inhibition.

Selection of suitable VCI's is guided by their final application environment and the metals that need to be protected. For examples, mixtures of several different inhibitors are usually called for, since most articles to be protected are made up of different metals and metal alloys. Information on different VCI chemistries for multi metal applications can be found on Reviews on Corrosion Inhibitor Science and Technology, papers given at the CORROSION/89 symposium (NACE Press, 1989), and in particular the paper of G. E. Fodor entitled "The Inhibition of Vapor-Phase Corrosion: a Review" that begins on page II-17-1 the disclosure of which is useful for background information and is hereby incorporated by reference.

Non limiting examples of vapor corrosion inhibitors include: primary, secondary and tertiary aliphatic amines; aliphatic diamines; cycloaliphatic and aromatic amines; polymethylimines; long chain ethanolamines; imidazolines; amine salts, for example those of carbonic, carbamic, acetic, benzoic, oleic, nitrous and chromic acids; acetylenic alcohols; lauric alcohol; alkyl chromates; organic esters of nitrous acid; organic esters of phthalic acid; organic esters of carbonic acid; nitronaphthalene; nitrobenzene; amides; mixtures of nitrites with urea, urotropine, or ethanolamines; naphthols; thiourea derivatives; heterocyclic compounds such as benzotriazole, tolyltriazole, and mercaptobenzothiazole and their respective salts; nitrated or sulfonated petroleum derivatives; and organic acid derivatives.

In various embodiments, it is desirable to incorporate VCI that have antimicrobial and especially antifungal activity. For example, it has been shown that meta-dinitrobenzene inhibits fungal growth, sporulation and pigmentation of fungi including: *aspergillus japonicus, curvularia lunata, penicillium pinophilum, trichoderma* sp., and *cladosporum* sp.

In various embodiments, the VCI in powder format contains particles that are 100% active corrosion inhibitor with no inert carrier. In this situation, the VCI comprises particles that consist of an active corrosion inhibitor or mixture of corrosion inhibitors.

Before incorporation into adhesives in various embodiments, powders of VCI can be mixed with other powdered materials, including powdered materials that do not themselves have the property of being a vapor phase corrosion inhibitor. As non-limiting examples they can be mixed with silica powder to improve handling; or can be mixed with antioxidants and/or UV stabilizers that are used in adhesive manufacturing. In this situation the VCI mixture with the other powder contains particles consisting of the VCI and particles consisting of the other material such as silica, antioxidant, stabilizer, and the like.

Vapor corrosion inhibitors suitable for use in the present teachings include those that are available in a powder format at room temperature and at temperatures to which the inhibitors are exposed during manufacture of the adhesive compositions. In a preferred embodiment, the inhibitors are solids at room temperature and remain solids at a temperature up to at least 100.degree. C. The inhibitor components themselves have suitable vapor pressure for releasing from the adhesive in use, or else they are capable of reacting with moisture and/or other components to generate a volatile chemical compound or compounds that can provide the desired corrosion inhibition.

To illustrate sodium nitride is a suitable VCI, it is a solid up to a temperature above 100.degree. C. Although the invention is not limited by theory, it is believed that NaNO.sub.2 provides vapor phase corrosion protection in part by participating in reactions in the presence of moisture and other inhibitors to provide volatile inhibitors such as formaldehyde, ammonia compounds, amides, and the like.

One class of vapor phase corrosion inhibitors is an organic nitrogen base salt of nitrous acid, also referred to as nitrite salts. The organic bases that form nitrite salts are generally selected from amines, guanidines, alkylated imidazolines, nitrosamines, and the like. Examples of nitrites include those of primary amines, secondary amines, tertiary amines, cyclic secondary amines (e.g. piperidines, oxazines, morpholine, thiazolines, thiaoxazines, diazoles, basic diazole derivatives, imidazolines, diazines, basic diazine derivatives, pyrrolidone, basic pyrrolidone derivatives, ureas, thioureas, hydrazines, hydroxylamines, amidines, guanamines, guanidine. In any of the above nuclei, alkyl, cycloalkyl, terpinyl, bornyl, aralkyl, benzyl, phenyl, aryl, and various substituent groups or radicals may be present sol long as the total basicity of the organic nitrogenous compound is sufficient that it can form a nitrite salt by reacting with nitrous acid.

Examples of nitrite salts include those of organic nitrogen bases such as:

1) Primary amines such as: methylamine, isopropyl amine, 2-amino-butane, tertiary butyl amine, 2-amino-4-methyl-pentane, various amyl, hexyl, heptyl, octyl and higher homologous primary amines where the amine group is attached to a secondary or tertiary atom; cyclopentyl amine, alkylated cyclopentyl amines, cyclohexylamine, monomethyl cyclohexylamines, dimethyl cyclohexylamines, trimethyl cyclohexylamines, other alkylated cyclohexylamines, bornyl amine, fenchyl amine, cycloterpenyl amines, pinyl amine, benzylamine, betaphenylethylamine, alkylated benzylamines, tetrahydro betanaphthylamine, allyl amine, beta-methyl allylamine, beta-chloro allylamine, and their homologs and analogs;

2) Secondary amines such as: di-methyl-, di-ethyl-, di-n-, propyl-, di-isopropyl-, di-butyl-amines; various secondary amines derived from amyl, hexyl, heptyl, oxtyl, and higher homologous alkyl groups; methyl isobutyl amine, N-methyl N-tertiary-butyl amine, N-alkyl N-cyclohexyl amine, N-alkyl N-bornyl amine, di-bornyl amine, N-methyl N-cycloterpenyl amine, N-isopropyl N-(1)-methyl amine, N-alkyl N-benzyl amines and their homologs and analogs; dicyclopentyl amine, di-cyclohexyl amine, alkylated dicyclohexyl amines; dibenzylamine, di-(beta phenyl ethyl)amine; piperidine, piperazine, alkylated piperidines or piperazines; alkylated and unalkylated oxazines such as morpholine and 2,4,4,6-tetramethyl tetra-hydro-1,3-oxazine; alkylated-1,3-thiazolines such as 2,4,4,6-tetramethyl tetrahydro-3-thiazoline;

3) Secondary amine type derivatives of alkylene diamines, such as: R.sub.1-NH—R.sub.2-NH—R.sub.3 wherein R.sub.1 and R.sub.3 may be like or different aliphatic, alicyclic, aralkyl, alkarylalkyl, heterocyclic, terpenic, radicals, and wherein R.sub.2 is an alkylene or cycloalkylene radical. These R.sub.1 and R.sub.3 radicals for instance, may be isopropyl, butyl, cyclohexyl, benzyl, and/or bornyl radicals. The R.sub.2 radical is preferably an ethylene, propylene or tetramethylene radical;

4) Tertiary amines such as: trimethyl amine, triethylamine, tri-n-propyl-amine, tri-isopropylamine, tributylamine, higher homologous and isomeric trialkylamines, variously N-substituted tertiary amines having different organic radicals on the amino nitrogen atom, e.g., alkyl, alicyclic, bornyl, fenchyl, aralkyl, and like homologs and analogs; and tertiary amine type derivatives of alkylene diamines;

5) Quaternary ammonium bases such as, tetramethyl and higher tetraalkyl ammonium bases; trimethyl benzyl-, trimethyl cyclohexyl-, tributyl decyl ammonium bases; various quaternary N-substituted ammonium bases having various organic radicals (of the type described herein) on the quaternary nitrogen atom; pyridinium and alkylated pyridinium or quinolinium quaternary ammonium bases having an alkyl cycloalkyl, or aralkyl group on the quaternary nitrogen atom, including methyl, butyl, cyclohexyl, benzyl groups, and the like homologs and analogs; and 6) Various organic nitrogenous bases, particularly guanidine, alkylated guanidines, alkylated thioureas, and also diazoles, imidazolines, diazines, pyrimidines, and the basic derivatives of these and other organic nitrogenous-base nuclei.

Suitable nitrite salts include without limitation betaphenylethylamine nitrite, piperidine nitrite, 3,3,5-trimethylcyclohexylamine nitrite, trimethylbenzyl-ammonium nitrite, di-isopropylamine nitrite, 2,4,4,6-tetramethyl-tetrahydro-3-oxazine nitrite, cyclohexylamine nitrite, 2-amino-butane nitrite, di-cyclohexylamine nitrite, morpholine nitrite, and dibenzylamine nitrite. Mixtures of nitrite salts can also be used.

As noted, it is usually desirable to provide a mixture of different vapor phase corrosion inhibitors to provide suitable protection for all of the metal or alloys found in the article to be protected. Suitable ferrous inhibitors include for example naphthalene and naphthalene derivatives, alkyl amines, alkyl amine salts, cycloaliphatic amines, dicycloaliphatic amines, dicycloaliphatic amine salts, aromatic amines, nitroaromatic acids, aminol salts, fatty acid quaternary ammonium, urea, thiazoles, benzimidazoles, benzotriazoles combined with tertiary amines, benzotriazoles combined with polyamine, and benzotriazole combined with di(cyclooctyl)amine nitrite.

Similarly, suitable copper metal vapor phase corrosion inhibitors can be selected from, without limitation, dicycloaliphatic amine salts, acetylenic alcohols, phenol carboxylic acids and esters, fatty acid quaternary ammonium slats, thiourea, thiazoles, benzimidazoles, benzotriazoles, benzotriazoles combined with tertiary amines, benzotriazoles combined with polyamines, and benzotriazole combined with di(cyclooctyl) amine nitrite.

In addition, certain corrosion inhibitors have been found suitable for protecting aluminum. These include alkylamines, dicycloaliphatic amines, dicycloaliphatic amine salts, aminol salts, thiazoles, benzimidazoles, as well as combinations of benzotriazoles with tertiary amines, polyamines, or di(cyclooctyl)amine nitrite. Suitable copper corrosion inhibitors include tolyltriazole, benzotriazole, and mercaptobenzothiazole, as well as their salts.

Another class of vapor phase corrosion inhibitors includes the salts of carboxylic acids such as benzoic acids or aliphatic carboxylic acids of about 3-20 carbon atoms. Suitable salts include ammonium, alkyl ammonium, sodium, and the like.

As noted, the vapor phase corrosion inhibitors are provided as powders and formulated into adhesive compositions with the methods described herein. Conveniently, salts as described above are available as powders that are solid up to 100.degree. C. or higher, and are preferred. Suitable inhibitors include those that are volatile enough to provide adequate corrosion protection in use, but not so volatile as to decompose or escape from the composition during formulation by the twin screw extrusion of methods described herein.

A vapor phase corrosion inhibitor suitable for use in the compositions generally show a vapor pressure of at least $10^{-6}$ torr, at least $2\times10^{-5}$ torr, or at least $10^{-4}$ ton. Inhibitors with too high a volatility and vapor pressure are avoided if the inhibitors themselves are solids at room temperature or at temperatures up to 100.degree. C. or higher. In this way, the vapor phase corrosion inhibitors are provided as solids or powders that can be formulated into the adhesive with the use of the titanate, zirconate, or silane coupling agents as further described herein.

Vapor phase corrosion inhibitors are incorporated into adhesive compositions at levels sufficient to supply the adhesive composition with vapor phase corrosion inhibitor properties during use in wrapping the protected articles. In various embodiments, suitable vapor phase corrosion inhibition by the adhesive compositions is measured by a "pass" rating for respective metal (iron, copper, aluminum, zinc, etc.) in an industry standard vapor phase corrosion test. Thus, suitable vapor phase corrosion inhibitors include those chemical compounds that, when formulated into an adhesive composition as described herein or when formulated for other anti-corrosion uses, result in a "pass" rating in standards such as the German standard TL-8135-002; as well as MIL-PRF-22019E.

In various embodiments, the corrosion inhibitors can be provided as a part of a masterbatch, where the masterbatch is made of the VCI material and a carrier or carriers. Such a masterbatch as part of a proprietary composition sold by suppliers of VCIs and can be produced by spray drying, by way of non-limiting example. Designation of the particles as a "VCI powder" reflects the physical nature of the resulting VCI composition. In various embodiments, the carrier polymers are made of thermoplastic elastomers or other block copolymers, as long as they are compatible with the matrix. For recyclability, the polymeric carriers can be based on a polymer that is largely ethylene based.

VCI in particle or powder form is formulated into adhesive formulation at a level sufficient to provide suitable corrosion protection in use. In general, levels of 0.1-20% by weight of the particles are suitable in most applications. In some embodiments, the VCI particles are incorporated at a level of about 5% to about 15% by weight, based on the total weight of the adhesive composition. The VCI additive can be a blend of multiple corrosion inhibitors such as a combination of dicyclohexylamine nitrite, ammonium benzoate, morpholine, sodium benzoate and benzotriazole. Other examples include mixtures of benzotriazole with benzoates of ammonia, guanidine, and hexamethylene-diamine; and a mixture of benzotriazole with guanidine benzoate and ammonium benzoate In addition to vapor corrosion inhibitors, other materials which may be added to the adhesive layer and which form a protective or treating vapor in the cavity enclosed by the wrapping material include anti-stats (static electricity removers and dissipaters), antioxidants, antimicrobials (to protect the product from bacteria and other biological contaminants), acid neutralizers, acid or bases (to effect pH changes), fragrances, additives that, when exposed to air, change color, thus indicating that the product has been tampered with, and others.

According to various aspects, an additive is added to a hot melt adhesive used to secure a fabric to a film and produce a wrap material used to protect articles. The additive releases a vapor into the package enclosed by the wrap material. The vapor mixes with the air enclosed within the package and any other vapors (such as moisture) in the cavity being protected. The vapor condenses on the surface of the product being protected and forms a thin, but highly effective, corrosion prohibiting layer or atmosphere. Should additional moisture enter the enclosed cavity, the vapor released by the additive forms it into a noncorrosive vapor. Furthermore, the film outer layer acts as a barrier preventing emission of the inhibitor into the atmosphere. Accordingly, the packaging material according to the present invention is a "one way" emitter, in which all of the additives is used to treat the product used with the material, and the additive is not emitted into the ambient atmosphere.

By placing the additive in the adhesive layer that adheres the fabric to the film layer, costs are reduced because less additive will be required and handling and inventorying are simplified. If the additive were placed in the film layer, the additive would release in both directions (both into the cavity enclosed by the material and outwardly into the atmosphere), thus requiring a substantially greater quantity of additive. By including the additive in the adhesive layer, the film acts as a barrier, preventing release of the vapor into the atmosphere. While it is possible to place the additive in the nonwoven fabric, the nonwoven would have to be put through a bath, which could potentially change the properties of the nonwoven fabric and reduce its cushioning, softness, and other desirable properties. Furthermore, if the additive were placed in either the film layer or in the nonwoven layer, separate quantities of film or nonwoven would have to be maintained in inventory for each of the additives that are to be used, and the additive would release continually from the time that the film or nonwoven is made. However, by putting the additive in the adhesive layer, the additive material can be kept in a closed container, and thus be prevented from releasing into the vapor form, until it is to be used. The additive can be mixed with the adhesive in its molten form just before the adhesive is placed in a dispenser, or the adhesive can be dispensed directly onto the adhesive layer at a different dispensing station adjacent the dispensing station through which the adhesive is dispensed onto the nonwoven layer. On the other hand, the adhesive can also be mixed with the additive when the adhesive is made and formed into block form prior to use. Since the additive will be encapsulated by the adhesive, release is minimized. By either dispensing the additive by separate station or mixing it with the adhesive just as the molten adhesive is placed in the dispenser, changing additive is effected almost immediately so that production interruptions are minimized.

The VCI can be produced in many different formats—powder, masterbatch or it can be carried in oil. A preferred format for the AAD system is the powder format. Two important considerations to keep in mind with the powder format is how to achieve a uniform blend throughout the adhesive manufacturing, and how to keep the properties of the adhesive so that the required viscosity levels during lamination and the required tack is not lost compared to the adhesive that does not have the AAD-VCI.

The VCI powder and the adhesive can be mixed together in a batch process. During the batch process, adhesive is placed in a mixer and the VCI powder—either separately or in a form pre-combined with a titanate and/or zirconate coupling agent as described herein—is placed slowly in the mixer in pre-set percentages. While a batch system produces acceptable results, it has been discovered that improvements in uniformity and reproducibility are achieved through the use of a continuous process, conveniently carried out in an extrusion apparatus such as a twin screw extruder.

The continuous process also produces adhesives of more uniform viscosity, which tends to minimize the need to run the downstream lamination process at variable temperatures to adjust for the higher or lower viscosity of test samples. Vapor corrosion inhibitors are heat sensitive by their nature. When the temperature is elevated there will be increase in the VCI release to the environment. So when higher temperatures are used during the lamination process, there could be a higher rate of VCI loss to the environment. It is generally preferred to run the lamination process at a consistent temperature and preferably as low a temperature as possible.

Coupling Agents

As noted, another step to improve product uniformity and to gain some of the lost viscosity characteristics of the hot-melt adhesive is to use various titanium and/or zirconium (Ti/Zr) coupling agents. Although the invention is not to be limited by theory, it is believed that esters of titanium or zirconium couple or chemically bridge two dissimilar species such as inorganic filler/organic particulate/fiber and an organic polymer through proton coordination. Proton coordination may be interpreted as a form of plasticizing, since the filler is being modified to act more like the matrix resin. Under melt compounding shear conditions, the titanate and/or zirconate assists in the removal of air voids and moisture from the particle surface, resulting in complete dispersion and formation of a true continuous phase, thus optimizing filler performance.

Titanates and Zirconates

In various embodiments, the coupling agent includes at least one compound selected from the group of compounds consisting of a titanate containing compound, a zirconate containing compound, and mixtures thereof. Examples include ethylenically unsaturated titanate containing compound and neoalkoxy titanate containing compounds. Non-limiting examples and their commercial designations from Kenrich Petrochemcials, Inc. include tetra (2,2 diallyloxymethyl)butyl-di(ditridecyl)phosphito titanate (KR 55), neopentyl(diallyl)oxy-trineodecanoyl titanate (LICA 01), neopentyl(diallyl)oxy-tri(dodecyl)benzene-sulfonyl titanate (LICA 09), neopentyl(diallyl)oxy-tri(dioctyl)phosphato titanate (LICA 12), neopentyl(diallyl)oxy-tri(dioctyl)pyrophosphato titanate (LICA38), neopentyl(diallyl)oxy-tri(N-ethylenediamino)ethyl titanate (LICA 44), neopentyl(diallyl)oxy-tri(m-amino)phenyl titanate (LICA 97), neopentyl (diallyl)oxy-trihydroxy caproyl titanate (LICA 99), and mixtures thereof.

Further examples of coupling agents include ethylenically unsaturated zirconates and neoalkoxy zirconate containing compounds. Non-limiting examples from Kenrich include (2,2 diallyloxymethyl)butyl-di(ditridecyl)phosphito zirconate (KZ 55), neopentyl(diallyl)oxy-trineodecanoyl zirconate (NZ 01), neopentyl(diallyl)oxy-tri(dodecyl)benzene-sulfonyl zirconate (NZ 09), neopentyl(diallyl)oxy-tri(dioctyl) phosphato zirconate (NZ 12), neopentyl(diallyl)oxy-tri(dioctyl)pyro-phosphato zirconate (NZ 38), neopentyl(diallyl) oxy-tri(N-ethylenediamino)ethyl zirconate (NZ 44), neopentyl(diallyl)oxy-tri(m-amino)phenyl zirconate (NZ 97), neopentyl(diallyl)oxy-trimethacryl zirconate (NZ 33), neopentyl(diallyl)oxy-triacryl zirconate (NZ 39), dineopentyl(diallyl)oxy-di-p-aminobenzoyl zirconate (NZ 37), dineopentyl(diallyl)oxy-di(3-mercapto) propionic zirconate (NZ 66A), and mixtures thereof.

Exemplary titanates include LICA 38 and LICA 09 from Kenrich Petrochemicals Inc. It has been discovered that use of the Ti/Zr coupling agents improves the compatibility of UV stabilized adhesive such as SEBS with the VCI powder and achieves the required overall flow characteristics for the final adhesive.

The Ti/Zr coupling agents are added to the adhesive at levels sufficient to obtain the noted advantages. In various embodiments, at least 0.1%, at least 0.2%, at least 0.4%, or at least 0.5% by weight is added, relative to the weight of the VCI. In various embodiments, up to 5% or up to 6% are used, where all percentages are by weight based on the weight of the VCI. Thus in various embodiments, the adhesive contains 0.1-6%, 0.1-5%, 0, 5-6%, or 0.5-5% of the Ti/Zr coupling agent, where the percentages are based on weight of the VCI particles.

In compounding, the Ti/Zr coupling agents can be added to the adhesive separately from the VCI particles, but at the noted weight ratios relative to the VCI. Alternatively or in addition, the VCI powder can be first combined with the coupling agent, and the resulting so-called "titanated" or "zirconated" VCI added as a single component to the adhesive. Thus, in one embodiment, VCI powder is sprayed with the Ti/Zr chemistry between 0.5% and 6.0% by weight to provide better compatibility between the VCI powder and the adhesive. Titanated VCI powder is termed VCI(T) in the Examples below.

Silanes

In various embodiments, the coupling agents are selected from those classified as silanes.

Examples of amino functional silane coupling agents include aminopropyltriethoxysilane; aminopropyltrimethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyldiethoxysilane; anilinomethyltrimethoxysilane; anilinomethyltriethoxysilane; diethylaminomethyltriethoxysilane; (diethylaminoethyl)methyldiethoxysilane; and methylaminopropyltrimethoxysilane.

Examples of sulfur functional silane coupling agents include bis(triethoxysilylpropyl)tetrasulfide; bis(triethoxysilylpropyl)disulfide; bis(3-ethoxydimethylsilylpropyl)oligosulfur; mercaptopropyltrimethoxysilane; mercaptopropyltriethoxysilane; mercaptopropylmethyldimethoxysilane; and 3-thiocyanatopropyltriethoxysilane.

Examples of epoxy silane coupling agents include: glycidoxypropyltrimethoxysilane; glycidoxypropyltriethoxysilane; glycidoxypropylmethyldiethoxysilane; and glycidoxypropylmethyldimethoxysilane.

Examples of (meth)acryl silane coupling agents include: methacryloxypropyltrimethoxysilane; methacryloxypropyltriethoxysilane; and methacryloxypropylmethyldimethoxysilane.

Examples of chloro silane coupling agents include: chloropropyltrimethoxysilane; chloropropyltriethoxysilane; chloromethyltriethoxysilane; chloromethyltrimethoxysilane; and dichloromethyltriethoxysilane.

Examples of vinyl silane coupling agents include: vinyltrimethoxysilane; vinyltriethoxysilane; and vinyltris(2-methoxyethoxy)silane.

Tackifiers

In various embodiments, the adhesive compositions contain tackifiers (also called "tackifying agents"). Due to addition of fillers in a hot melt adhesive, the base adhesive tends to lose some physical properties, like any other polymer that contains fillers. For example, when the VCI powder is added to the hot melt adhesive, the adhesive tends to lose "tack." Tack is an important property for laminations, both for "initial tack", which bonds the two surfaces together, and for the life of the laminate so the laminate does not delaminate over time during its life cycle. In order to make up for the loss of tack, one solution is to increase the amount of adhesive put into a laminate used to match a "similar" bond strength, that would be achieved with an unfilled adhesive. A suitable tackifier is Regalrez 1018 supplied by Eastman Chemical.

Also adding tackifying agents can act as a encapsulating agent. In a mixture of components having different viscosities, a component of lower viscosity has a marked tendency to encapsulate the second component in binary blends. Thus in various embodiments, tackifiers of low viscosity are added to encapsulate the adhesive containing dispersed corrosion inhibitors. A suitable tackifying agent has a viscosity of 10 poise or less at 60.degree. C. Other suitable tackifying agents are characterized by a viscosity of 100 poise or less at 40.degree. C. and/or by a viscosity of 1000 poise or less at 30.degree. C. Regalrez 1018 is an example of a tackifying agent having viscosity within these parameters.

In various embodiments, resins useful as tackifying agents are low molecular weight amorphous polymers and they are widely used to make adhesives to generate tack and specific adhesion. The resins are of three main groups in the industry: Rosin Resins, Terpene Resins and Hydrocarbon Resins. Examples of hydrocarbon resins include C5 aliphatic resins, C9 aromatic resins, and cycloaliphatic resins (such as dicyclopentadiene or DCPD resin). Hydrogenated resins of C9, C5 and/or DCPD resins are also suitable. The hydrogenated resins increase the outdoor usage of the finished adhesive. Compatibility of tackifying resins with the matrix polymers in the adhesive is important to achieve a good product. Color, softening point, molecular weight, glass transition temperature, melt viscosity, thermal stability and polarity of the resins are other criteria to consider for adhesive applications. For a discussion of tackifying agents, see for example www.specialchem4adhesives.com; "Chemistry of Tackifying Resins Part I, Part II & Part III" the content of which is useful for background information and is incorporated by reference. Regalrez 1018 has proved to be a good candidate as far as compatibility since it is rated to be compatible with various chemistries such as polyethylene, polypropylene, ethylene-propylene copolymers, natural rubber, EPDM, butyl rubber, SIS and SEBS blocks.

When the VCI adhesive is manufactured by a twin screw method, it is possible and preferable to add tackifying resins in screw zones downstream from addition of the VCI particles and coupling agents. In various embodiments, the tackifying resins are saturated hydrocarbon resins, hydrogenated synthetic polyterpenes, natural hydrogenated terpenes, and the like. Suitable tackifying resins are described for example in U.S. Pat. No. 5,204,390, the disclosure by which is incorporated by reference. Further suitable examples include hydrogenated aliphatic petroleum hydrocarbon resins, aromatic hydrocarbon resins, and hydrogenated derivatives thereof. If desired, mixtures of two or more tackifying resins can be added. Other suitable tackifying resins include hydrocarbon, (e.g. C5 to C9) resins, polyterpenes, and rosin esters of pentaerythritol and glycerol. In various embodiments the tackifiers can be added to reduce viscosity and/or improve wetting.

In various embodiments, the adhesive compositions contain from about 1% to about 15% tackifying resin, from about 5 to about 10%, or from about 5 to about 7% tackifying resin, based on the total weight of the adhesive composition. In certain embodiments, the base adhesive used to formulate the compositions already contains a certain percentage of tackifying resin as part of the commercial product being used. In such embodiments, the downstream blending of additional tackifying resins is reduced by a corresponding amount.

The tackifying agent is preferably added downstream of the VCI particle, and is added at a relatively low shear for a relatively short time to avoid too high a degree of mixing or miscibility into the adhesive. It is believed that the relatively low degree of mixing of the tackifier leads to encapsulation of the particles in the composition, making the tackifier act as a shell. This tends to increase the pressure sensitivity of the adhesive (desirable for downstream use in lamination processes) while at the same time decreasing the viscosity or at least avoiding an unacceptable increase in viscosity, which is also desirable for downstream processing. In one aspect, the invention is characterized by an adhesive containing added tackifying agent (tackifier) that has a melt index or viscosity no higher than the adhesive before addition of the tackifying agent.

Foaming Agent

A foaming agent can be added to the adhesive composition. In the continuous process, the foaming agent is preferably added downstream of addition of the VCI particle and coupling agent. Alternatively, foaming agents can be added to the adhesive compositions in a continuous process during lamination or adhesive coating.

Foaming agents contain an active ingredient that produces a gaseous decomposition product when subjected to an activating temperature, which is a characteristic of the agent. In various embodiments, it is preferred to use a foaming agent that will not be activated during compounding in any of the stages described herein, but that will decompose to provide volatile blowing agent at a later temperature of lamination during which the adhesive composition is applied to a substrate. In a non-limiting embodiment, a foaming agent is selected that has a decomposition temperature of 140.degree. C. or higher, for example from 140-150.degree. C. A suitable foaming agent is Celogen® 780, an activated azodicarbonamide sold by Crompton and having a decomposition temperature of 140-150.degree. C. It can be formulated in the continuous process described herein at temperatures below 140.degree. C. in all the stages, and then subjected to temperatures of 140-150.degree. C. in a subsequent lamination process to foam the adhesive.

Microspheres

Compounded adhesives described herein can further contain microspheres. In various embodiments, the microspheres are small spherical plastic particles. They can consist of a polymer shell encapsulating a gas. When the gas inside the shell is heated, the pressure inside is increased and the thermoplastic shell softens. The result is an increase in the volume of the microspheres. The microspheres can thus be used as lightweight fillers or as blowing agents. Suitable microspheres include those available under the Expancel trade name. The use of microspheres adds volume to the adhesive, allowing more area coverage with less adhesive. As a result, the use of the microspheres will also tend to lower the final weight of the laminate using the adhesive.

Films or Tapes Using the Adhesives

In various embodiments, the adhesive composition is used in a tape application, otherwise referred to herein as a patch application. In such applications, the adhesive is applied to a substrate such as an olefin film, non-woven, or woven material. Combinations of substrates can also be used. The resulting composite product, comprising a substrate and an adhesive composition disposed on at least one side of the substrate, can be used as a tape product.

In various embodiments, composite articles contain a substrate with an adhesive disposed on at least one side of the substrate. As illustrated further herein, one use of the adhesive is to bond a non-woven material to a polymeric film to provide wraps to protect articles. Other composite articles can be made that have materials bonded to both sides of a substrate, if both sides of the substrate are coated with the adhesive.

As noted, a continuous process for compounding the adhesive has been developed. It has been found that a continuous, twin-screw extrusion system with weight % feeders provides a more uniform adhesive. Compared to a batch system where the adhesive stays molten for a long period of time, the amount of time that the adhesive stays molten and the VCI sees heat can be shortened in the continuous process, leading, it is believed, to improvements in the overall physical properties of the end product.

Figure 2:
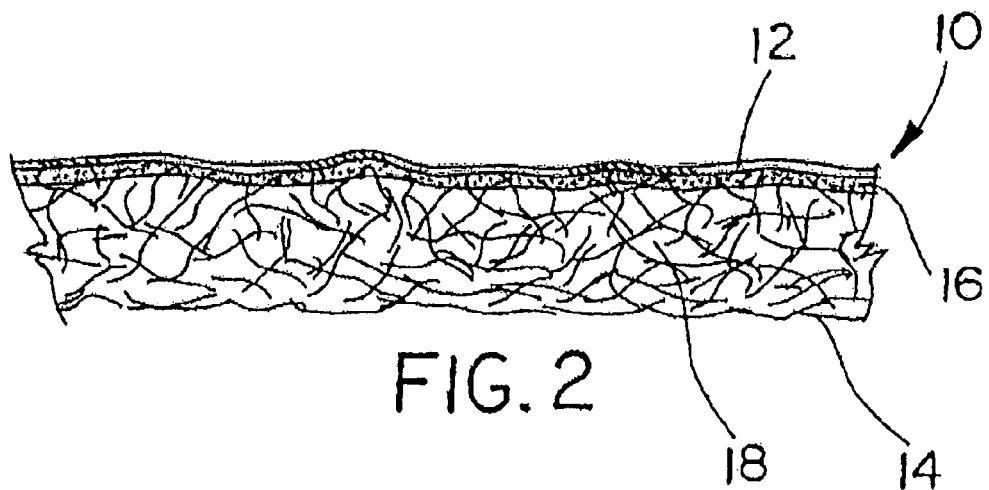
FIG. 2 is a cross-sectional view similar to FIG. 1 but illustrating the wrapping material according to the present invention after it is shrunk around an article.

Referring now to FIGS. 1 and 2 of the drawings, a laminated product or shrink wrap material generally indicated by the numeral 10 includes a layer 12 consisting of a shrinkable, stretchable, or other film. In one embodiment, the film has a predetermined shrink response in response to heat applied to the film. A second layer 14 is secured to the layer 12 by an adhesive layer generally indicated by the numeral 16. Layer 14 is a woven or nonwoven fabric, by way of non-limiting example.

The first layer 12 may be of any known type of a shrinkable, stretchable, or other film well known to those skilled in the art, but is illustratively a polyolefin or an ethylene vinyl acetate copolymer. However, other films may be used. Non-limiting examples of films include those that are amorphous, substantially amorphous, crystalline, or semi-crystalline. Depending on the composition and intended application, the film 12 can have stretch properties, shrink properties, or stretch/shrink properties.

The fabric 14 may be of any well known type, and may include both natural and manmade fibers, or combinations thereof, such as polyester, nylon 6,6 or a combination of wood pulp and polyester fibers. The fabric 14 can be woven or nonwoven. Typical fabrics are sold by the Dupont Corporation under the trademark SANTARA or by Fiberweb North American identified as Fabric PBN-2. A nonwoven fabric may be spun bonded or it may be formed from crimped fibers by carding. It will be noted that the fibers forming the nonwoven fabric 14 cooperate to define voids 18.

It is to be understood that the film layer 12 and fabric layer 14 can be made up of a plurality of individual layers that combine in the laminated product 10 to build up the total thickness of the respective layers. Thus, when the layers are produced by co-extrusion, there may be 3, 5, 7, or 9 co-extruded layers in the film, by way of non-limiting example. Likewise, the fabric can be made of a plurality of layers laid down in any known process.

The adhesive layer 16 preferably comprises a hot melt adhesive in the block copolymer family. According to the invention, an additive is dispersed throughout the adhesive layer 16. The additive is preferably in particle form and is known commercially as a vapor corrosion inhibitor (VCI). VCI contain volatile amines or other chemical species. They are sold commercially in particle form. A suitable VCI is sold by Cortec Corporation of St. Paul, Minn. under the designation M-138, in a non-limiting example. In an advance, the adhesive layer also contains a titanium and/or zirconium coupling agent. Upon exposure to the moisture in the air, volatile amines in the VCI vaporize to provide a corrosion resisting atmosphere by combining with the moisture in the air, as will hereinafter be described.

In various embodiments, the adhesive mixture is compounded by adding VCI particles and Ti/Zr coupling agents separately to a hot melt adhesive in a continuous process, or by combining the VCI particles with the coupling agent and adding the Ti/Zr containing VCI particles to the hot melt adhesive. In one embodiment, thermoplastic rubber particles, tackifiers, plasticizers and mineral oil are mixed together, cooked down in a manner well known to those skilled in the art, and then poured into a block mold. The fractionalized VCI particles optionally containing a Ti/Zr coupling agent may be mixed in directly with the other ingredients as the mixture is being heated or can be drawn into the mineral oil before the mineral oil is mixed with the other ingredients. Alternatively, the VCI particles and the coupling agents are added separately, as further illustrated below. Typically, the mixtures contains the VCI particles in a level of about 1% to about 25% by weight or about 5% to about 20% by weight. The other ingredients are mixed in proportion well known to those skilled in the art, which can vary according to the properties of the adhesive that are desired.

Figure 3:
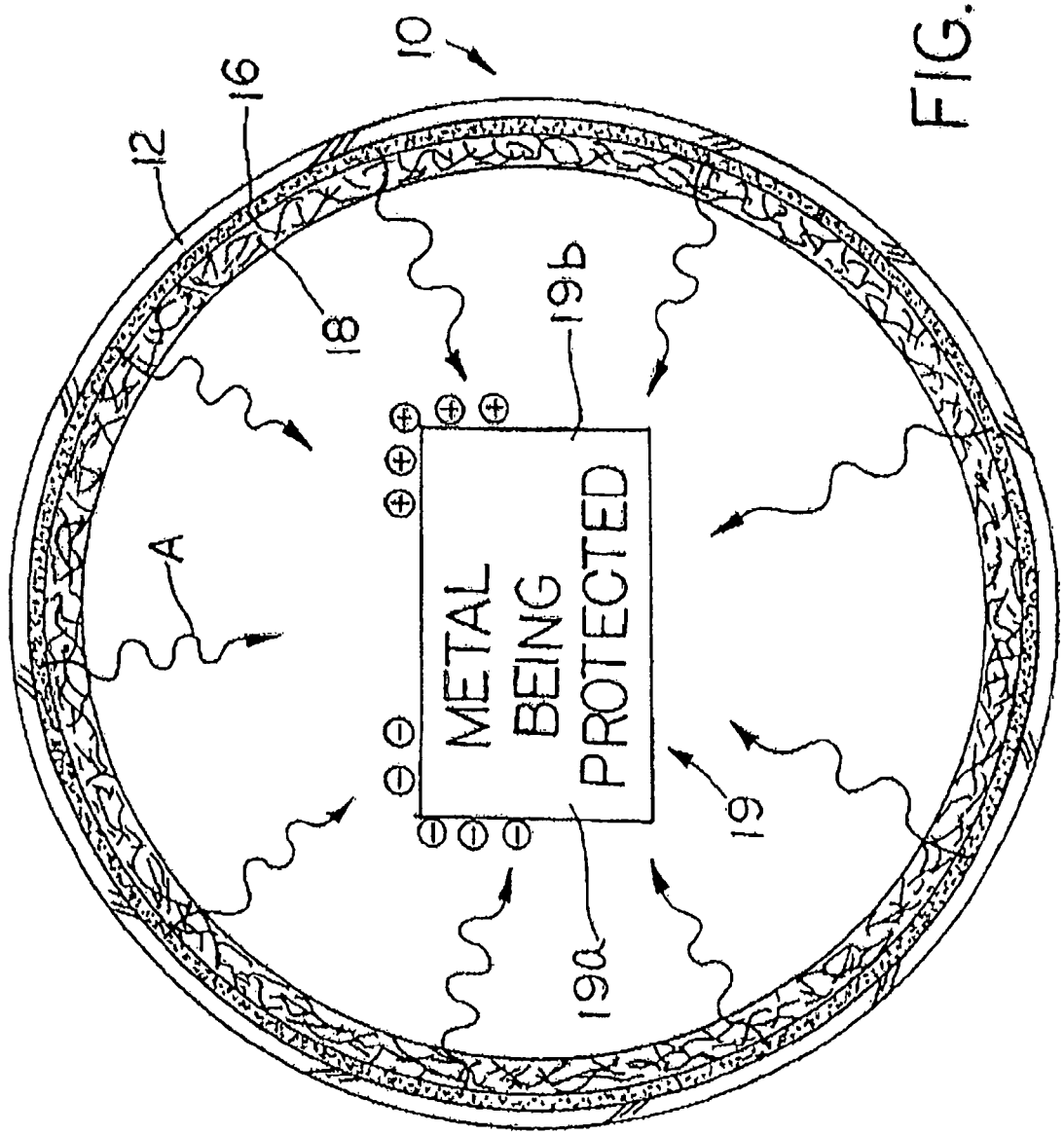
FIG. 3 is a view similar to FIG. 2, but illustrating the manner in which the present invention inhibits corrosion of products wrapped with the wrapping material of FIGS. 1 and 2.

The thickness of the adhesive layer 16 has been exaggerated in FIGS. 1-3 for clarity. Preferably, the nonwoven layer 14 has an irregular surface, and the adhesive adheres only to the raised portions of the surface to the film 12. This permits nonwoven layer 14 to aerate during shrinking, as the air entrained in the voids 18 expands, so that, after shrinking, as illustrated in FIG. 2, the nonwoven layer has expanded to provide additional cushioning.

Referring to FIG. 3, the article 19 wrapped by the material 10 divides itself into anodic regions 19a (carrying a negative charge as indicated in FIG. 3) and a cathodic region 19b (carrying a positive charge as indicated in FIG. 3). Rust and corrosion occurs as moisture entrained with the volume enclosed by the wrapping material transfers charges between these regions. The film layer 12 acts as a barrier preventing the vapor corrosion inhibitor (VCI) within the adhesive layer 16 from emitting to atmosphere. Accordingly, the VCI is emitted inwardly as indicated by the arrows A. The fact that the material 10 acts as a "one way emitter" conserves the VCI additive.

As also discussed above, the material 10 is shrunk around the products by applying heat, thereby causing the shrink/stretch film to shrink around the product, but the nonwoven layer 18 acts as a cushion between the films and the product to prevent the product from being damaged due to contact with the shrink/stretch film 12. When the material 10 is being shrunk around the product, the product is extremely vulnerable and most corrosion that occurs will occur when the product is initially wrapped and the humidity level within the wrapping is highest.

The VCI additive is activated by humidity, acidity, and/or heat. Since the material 10 is generally shrunk around the product using heat, the VCI is initially heated upon wrapping. Accordingly, a very high dose of VCI is emitted during the wrapping by the heat applied to shrink the material around the product. This very high dose of inhibitor counteracts the moisture within the material. The VCI condenses on the product 19, and combines with the moisture to form a corrosion preventive salt which protects the material. Accordingly, after the moisture within the package is counteracted by the VCI, a protective film is formed on the item or items being wrapped. The VCI within the adhesive layer 16 continues to emit after the initial high dose, but at a lesser level, for a limited period of time, which may be as much as two years. Accordingly, moisture within the package is continually counteracted by the VCI.

As discussed above, the VCI additive can be added to the adhesive when the adhesive is made, and will be contained within the block of adhesive. When the adhesive is melted to be used, the additive is first exposed to atmosphere and thus very little of the additive occurs before the adhesive is used. The additive may also be added to the adhesive after the adhesive is melted. The additive and the adhesive are mixed together and then placed in a dispenser as will hereinafter be described for dispensing the adhesive onto the nonwoven fabric 14. Again, the additive is kept in sealed containers before being added to the adhesive, so that very little of the additive is wasted before it is used. Finally, the additive can be dispensed directly onto the nonwoven material 14 at a station adjacent to, but separate from, the station dispensing the adhesive onto the nonwoven material. In any event, the additive is not exposed to air or moisture before it is used. Furthermore, changing the type of additive is relatively simple. If the additive were added to either the film or the nonwoven material, large quantities of these layers would have to be stocked in inventory so that the material containing the proper additive would be available. By mixing with the adhesive during application of the adhesive to the batt or just before the adhesive is applied to the batt, maximum flexibility is permitted.

Figure 4:
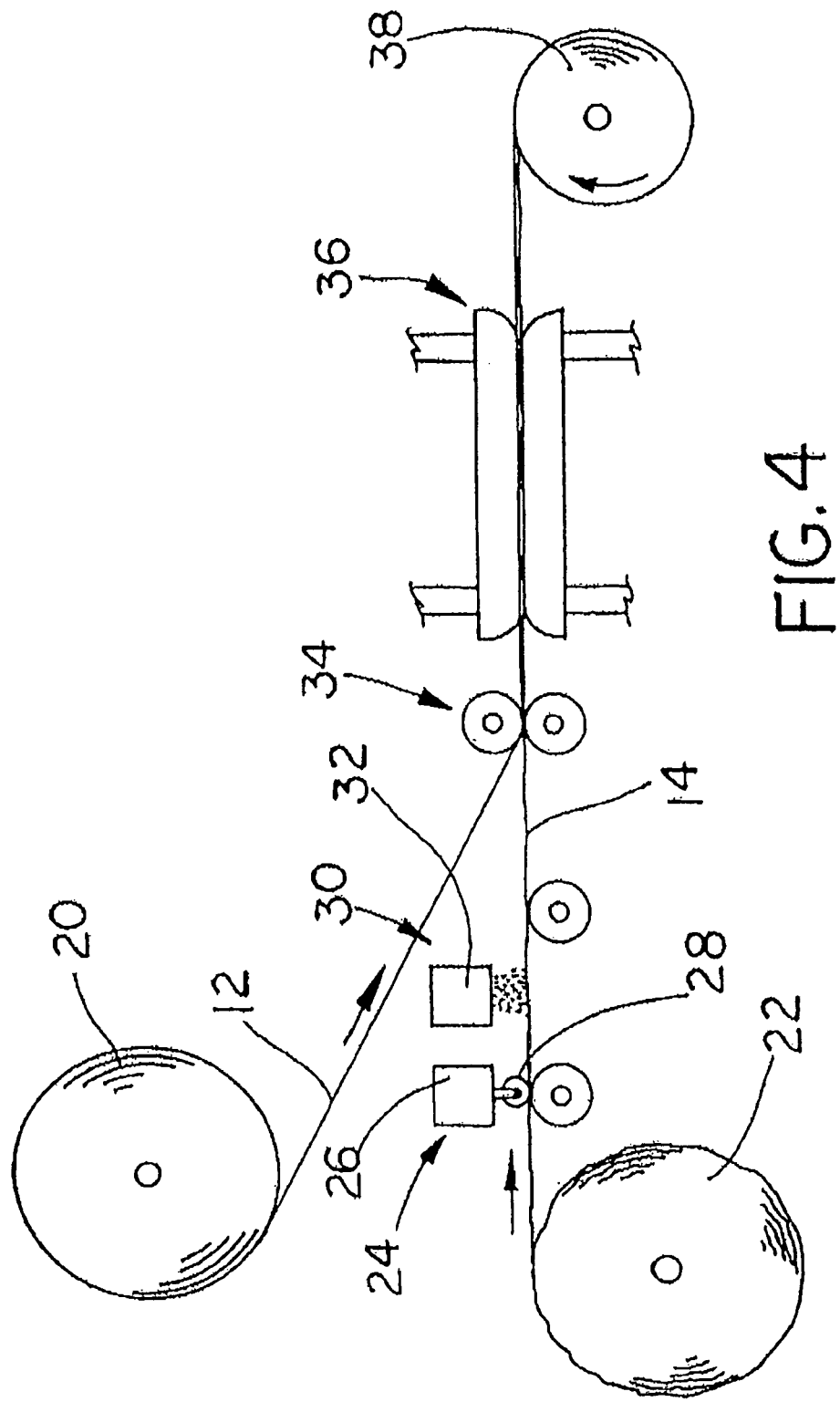
FIG. 4 is a schematic illustration of the manner in which the wrapping material according to the present invention is manufactured.

Referring now to FIG. 4, the film 12 is fed from a roll 20 and the nonwoven fabric 14 is fed from a roll 22. The fabric 14 is fed through a gluing station 24 which the aforementioned hot melt adhesive is stored in a reservoir 26 and lightly applied to the upper surface of the fabric 14 by dispensing roller 28, in a manner well known to those skilled in the art. If the aforementioned additive has not been mixed with the hot melt adhesive before it is placed in the reservoir 26, the additive is spread from a station generally indicated by the numeral 30 onto the upper surface of the fabric 14 at about the same place where the adhesive is dispensed thereon. The additive is stored in a reservoir or container 32 and spread on the fabric 14 in any well known manner. The fabric 12, and the nonwoven fabric 14 with the adhesive and additive spread thereon, are fed through guide rollers 34 toward bonding station 36. Bonding station 36 is adjusted such that the film 12 is brought in touching engagement to the fabric 14 without substantial pressure being applied to either the film 12 or the fabric 14. Since the adhesive preferably does not wet through the fabric 14, bonding takes place only on a small percentage of the fabric and film 12. Bonding station 36 is adjusted such that the film 12 is brought in touching engagement with the fabric 14 without substantial pressure being applied to either film 12 or the fabric 14. If the additive is mixed with the glue, the additive can be put in the adhesive up to 25% concentrations by weight without causing any substantial loss of adhesion or other properties. After passing through station 36, the material is wound on a roll 38.

Referring now to FIGS. 5 and 6, the material 10 is particularly suitable for protecting large articles such as a van 40 (FIG. 5) or a motorcycle 42 (FIG. 6). Other articles, such as lawn and garden equipment, boats, other recreational equipment, etc. are also suitable for wrapping with material 10 and treatment by an additive carried in the adhesive layer 16. The van 40 is wrapped in a bag 43 of the material 10. Heat is then applied to shrink the material against the van 40. As discussed above, as the material shrinks, nonwoven layer 14 aerates or expands, due to expansion of the air entrained in the voids defined by the fibers defining the nonwoven fabric, thus softening the material, protecting the vehicle 40 against articles such as stones that may be hurled against the vehicle during transport. Since the outer film 12 is impervious, the vehicle is also protected against environmental contaminants, such as acid rain. However, even under the best of circumstances, corrosion can take place on exposed, unpainted metal parts of the van 40, particularly when the vehicle is shipped overseas or packaged/shrunk wet or with trapped moisture. Accordingly, the additive in the adhesive releases a constant vapor which settles on and protects the exposed metal part of the van 40. In FIG. 5, material 44 is wrapped around the motorcycle 42. Again, the motorcycle 42 includes many exposed, normally unpainted, metal parts. Consumers expect that expensive products be in pristine condition wherever received, even though the products may spend many months in storage and transport, particularly when exported overseas. Accordingly, the motorcycle 42 is protected by the vapor corrosion inhibitor carried in the adhesive.

Other equipment, such as electronic equipment, may be wrapped with the material 10, but with antistats, such as stat removers or static electric dissipators, added to the adhesive layer 16. Other products, such as surgical equipment, may be protected against contamination by anti-microbials carried in the adhesive layer 16. Fragrances may be added to the adhesive layers, so that when the packaging is cut away, a pleasant odor surrounds the product. Other types of additives, well known to those skilled in the art, may also be added to the adhesive. In any case, the vapor admitted by the additives is prevented from escaping into the ambient atmosphere by the film 12, the vapor readily passes through the open, expanded woven layer, since the fibers comprising the nonwoven material define large, air-filled voids which provide little resistance to passage of the vapor.

The invention can also be used with a tape material. Such tape materials are used to protect products during transit by applying a film to the surface of the product. Referring to FIG. 8, adhesive layer 56 containing a composition like that of adhesive layer 16 of FIG. 1 is applied to one side of a film 58. The adhesive is used to adhere the film to a surface of the product to be protected, thereby protecting the product. The film may be any conventional film, including stretch films and shrink films. The adhesive may be any suitable adhesive well known to those skilled in the art, including hot melt adhesives. Since the film is impermeable to the vapor corrosion inhibitor, the tape may be wrapped around portions of an article where protection is desired, and the film does not allow the additives to escape into atmosphere. Accordingly, all of the additive is used to protect the product. Tape material is particularly useful in protecting machined portions of large articles. For example, many machined components have machined surfaces comprising only a portion of the total product. These surfaces must be protected against corrosion. Accordingly, the tape material may be wrapped around these machined surfaces so that the machined surfaces are protected. This is more cost effective than wrapping the entire article, when only a portion of the article corrosion protection necessary.

Figure 9:
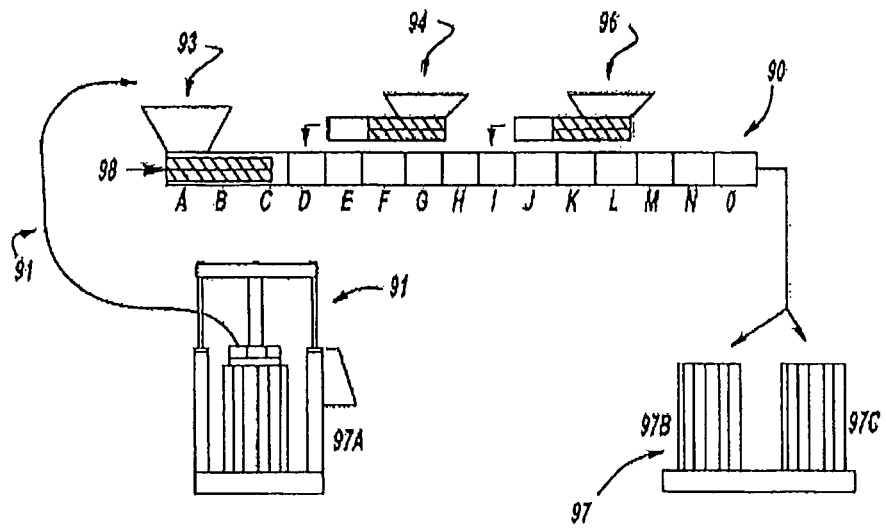
FIGS. 9, 10, and 11 show configurations of a twin-screw apparatus.
Figure 10:
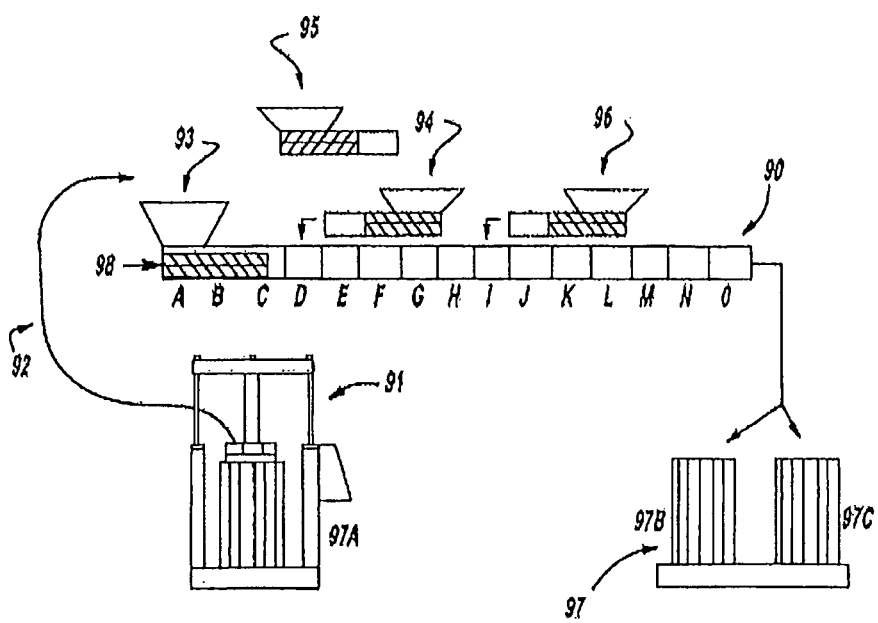
Figure 11:
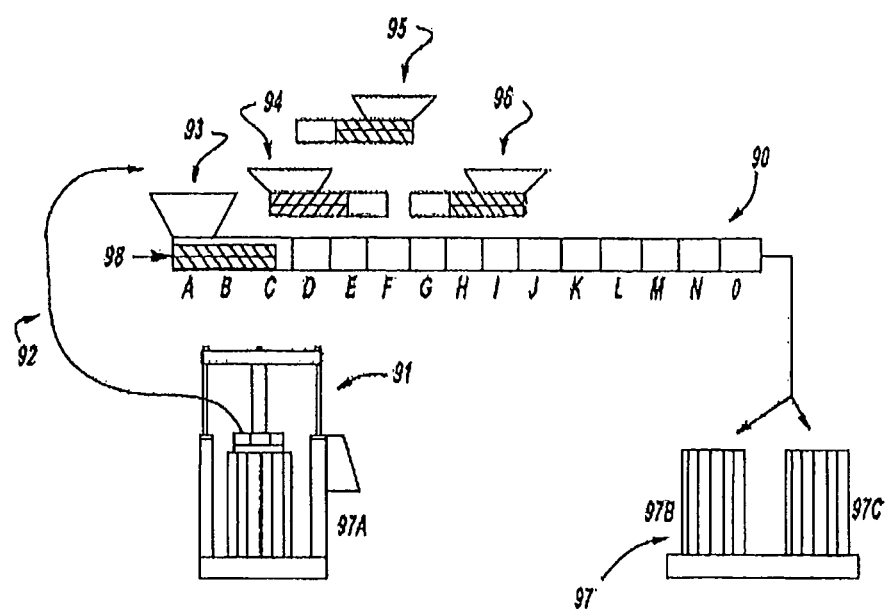

Illustrative continuous processes are shown in FIGS. 9-11. In non-limiting fashion, they illustrate various ways of implementing a continuous process with the four stages described herein. A twin-screw compounding process, when starting with a pre-made hot melt adhesive, starts with the melting of the adhesive. Referring to FIG. 9, the adhesive is melted at the required temperature, in a melting tank (not shown), or more preferably, when the adhesive is supplied in a drum (97a), by an on demand drum-melter (91) and pumped to the twin-screw extruder (90) by means of a heated hose (92). Thus in a first stage, an adhesive is melted. The twin-screw extruder can be similar to ZSK 30 mm twin-screw extruder at Aspen Research Inc. In various embodiments, the hot-melt adhesive is a shear sensitive block-copolymer, which means it will keep its liquid form due to shear forces of the twin-screw (98). Once the adhesive enters the screw, low viscosity can be achieved by increasing the shear forces instead of maintaining a high temperature. This means the temperature in the screw apparatus can be lowered compared to the melt. This is important because the performance of some additives or coupling agents, such as titanates and zirconates, is temperature dependent until they are completely blended into a compound. Also primary, secondary antioxidants or UV packages are mostly "sacrificial" and the lower processing temperatures help save these packages for the life-time of the product.

Continuing in FIG. 9, a second stage is illustrated by zones A through D, where the shear is increased and the temperature lowered relative to that of the first stage, to maintain melt flow at a lowered temperature. Then in a third stage, once the adhesive is flowing at increased shear and lower temperature between zones A and D and the temperature is low enough to accept the filler/additive safely, the additive can be fed into the twin-screw beginning at zone E as illustrated in FIG. 9. AS shown in FIG. 9, the additive added at E is coated with titanate/zirconate coupling agent in a separate process (not shown) before being added together in feeder 94. The goal of the initial compounding point is to bring in the "primary additive" (i.e., the VCI particles a weight level of about 1%-25%) along with a coupling agent. This will allow the primary filler/additive to be fully compounded with the help of the coupling agent by the end of the extrusion process. These fillers can be added by means of volumetric feeders (94) in either liquid or powder form. Zones E through I can be considered the third stage in FIG. 9. Further in FIG. 9, a fourth stage is illustrated where further additives (such as tackifiers, etc.) are added by way of volumetric feeder 96 into the adhesive at zone J.

The process illustrated in FIG. 9 (as well as the variations illustrated in FIGS. 10 and 11) involves melting adhesive in a first stage at a first temperature, which is preferably above the melting temperature of the adhesive. In zones A-E, the temperature is lowered while the shear rate is increased. Additive is added in zone E; in zones F—H, the temperature can be raised if desired to facilitate blending of the VCI particles, but preferably is still kept below 100.degree. C. and more preferably below 90.degree. C. while the Ti or Zr coupling agent is "exfoliated" into the VCI particles. Secondary additives such as tackifiers are added at zone I by feeder 96, where the temperature is lowered slightly if desired. At zone J, after addition of the secondary additives, the temperature is increased if desired for faster output, but is still preferably kept below a temperature at which volatile vapor phase corrosion inhibitor might be lost from the composition.

Volumetric feeders (94, 95, 96) with their screw design provide high accuracy on weight percent additions over gravimetric feeders and therefore they are the preferred feeding system for this application. In various embodiments, the filler/additive (VCI particle) can be pre-coated with a coupling agent, such as a titanate or zirconate, such as LICA 09 and LICA 38 from Kenrich Petrochemical Inc., with a predetermined loading between 0.01%-6.00% to be let down in the compound. However, the filler/additive does not have to be pre-coated by a coupling chemistry. With the addition of a secondary volumetric feeder which will feed the titanate or zirconate on to the filler or with a precise spraying method the titanate or zirconate can be added on the filler/additive at the time of the compounding process. FIG. 10 illustrates a variation where VCI particles are added through feeder 94 and coupling agent is added downstream by feeder 95. FIG. 11 illustrates the opposite configuration, where coupling agent is added by feeder 95 upstream of addition of VCI particle by feeder 94.

It is preferred that the filler/additive is not pre-coated by any other chemistry that might prevent the titanate or zirconate coupling agent to attach itself on the filler/additive. "Secondary" additives—normally less than 5% by weight of the total adhesive composition—such as optical-brighteners, fillers, biocides, anti-microbial agents can also be added into the adhesive along with the titanated primary filler/additive or in a separate step. Once the titanated filler/additive is added at zone D, the temperature can be increased in order to increase the flow of the compound. At this point, the adhesive is 1%-25% by weight filler/additive. Once the filler/additive is blended in the adhesive, the temperature of the compound does not effect the properties of the titanate or zirconate coated on the filler/additive. The addition of the secondary additives, by means of volumetric feeders (96), is preferred to take place further down the screw in zones E-O, after the "primary filler/additive" has been fully compounded. If necessary, the temperatures can be lowered and the shear forces can take over to flow the adhesive compound, before the addition of the "secondary additives". After all the fillers/additives are in the adhesive the temperatures can be increased to help with the melt flow.

The finished adhesive compound is then metered and pushed out of the twin-screw extruder and adhesive flows into drums (97b, 97c) for storage and shipping. Even cooling of the adhesive is important while they are being fed into the drums. In order to decrease the "cool down" period of the adhesive can be split into two drums alternatively, and allow the cooling to take place more evenly.

The apparatus may also include a carousel (not shown) for changing out the receiving drums 97b and 97c. As shown in illustrative fashion, the drum of adhesive 97a can contain an adhesive base such as a block copolymer and in addition optional ingredients such as tackifiers, extenders, a UV package and antioxidants. If desired, other additives can be compounded into the adhesive at port 96 as discussed above.

A variation of a continuous process is provided in FIG. 10. The configuration in FIG. 10 can be used to add the VCI and the Ti/Zr coupling agents separately. As shown in FIG. 10, VCI particles are added at input port 94 and coupling agent is added at input hopper 95. As shown in FIG. 10, the addition of VCI into the adhesive mixture takes place before the addition of the Ti/Zr coupling agents. As noted above, the relative amount of Ti/Zr coupling agents to VCI particles is in the range from 0.01 to 6% by weight.

A variation is shown in FIG. 11, wherein the coupling agent is added through hopper 95 at a region of the twin screw extruder that is upstream of the entry point of the VCI at hopper 94. In both FIGS. 10 and 11, secondary additives are optionally added at input port 96 as described above.

Advantageously, the continuous process in the twin-screw extruder permits the adhesive to be mixed while holding the mixture at elevated temperatures for reduced periods of time, relative to a batch process. Also, in the continuous process, the mixture can be cooled from the original melt temperature (needed to pump the molten adhesive) to a temperature low enough that degradation and volatilization of the VCI is not observed. Improved mixing also leads to better dispersion of the VCI particles in the adhesive matrix.

Further non-limiting description is given in the Examples that follow.

EXAMPLES

Example 1

Using a ZSK 30 mm twin-screw extruder-screw design A42723.001, at Aspen Research Inc. St. Paul, Minn., the initial integration of VCI(T) powder to the adhesive was improved dramatically in terms of speed, quality and uniformity. In this system the hot-melt adhesive is pumped from a drum to the 30 mm twin-screw extruder with the hose temperature at 155.degree. C., melt temperature at 125.degree. C. When the adhesive reached to the barrels the temperatures were lowered to 110.degree. C.-120.degree. C. range which provides a safe compounding temperature for the VCI(T) powder by preventing loss of excess VCI and burning the titanate. The SEBS rubber that makes up the matrix for the original adhesive is shear sensitive. This way it allows the twin screw turn and push it through the barrel at a lower temperature without losing shear. This allows the adhesive to be at a lower temperature suitable for VCI(T) application.

In the experimental process, vapor phase corrosion powder consisted of benzotriazole, benzoic acid ammonium salt, dicyclohexylammonium nitrite, benzoic acid sodium salt and Sodium nitrite and was used as the "primary" additive. The powder was coated with 1.2125% LICA 38 or with 1.2125% LICA 09 Titanates, where the percentages are by weight based on the weight of the powder. Both the LICA 38 and LICA 09 are hydrophobic organotitanates. They were chosen to improve the outdoor water resistance of the already saturated hot-melt adhesives. If hydrophilic properties are desired, organotitanates such as LICA 38J can be used also. The adhesives used in the experiment were provided by two different manufacturers. Adhesive 1 is NW1133 from H.B. Fuller, while Adhesive 2 is Tra16-UVF from Savare Specialty Adhesives. The experiment also involved a secondary additive optical brightener/fluorescent whitening agent from Mayzo-Benetex® OB.

The adhesives were melted on-demand by a drum melter at 110.degree. C.-120.degree. C. range and the shear force of the screw was used to keep the adhesive flowing. In the experiment, the Titanate coated VCI powder-primary additive—and the optical brightener-secondary additive—were added at all one-location zone (D). Atmospheric vents were placed in zone 3(C) and 7(G)

Formulation 1 consists of adhesive 1 at an 88.7875% loading with a 10% loading of VCI Powder, 1.2125% Titanate Lica 09 and Optical Brightener. Formulation 2 has adhesive 2 at a 88.7875% loading with a 10% loading of VCI Powder, 1.2125% Titanate Lica 09 and Optical Brightener. Formulation 3 has adhesive 1 at a 88.7875% loading with a 10% loading of VCI Powder, 1.2125% Titanate Lica 38 and Optical Brightener. Formulation 4 has adhesive 2 at a 88.7875% loading with a 10% loading of VCI Powder, 1.2125% Titanate Lica 38 and Optical Brightener. Comparative analysis will be performed and will consist of SEM and Viscosity Curves.

TABLE 1

| Formulation number | Adhesives | VCI Powder % | Adhesives % | Titanate % |
|---|---|---|---|---|
| 1 | Adhesive 1 | 10 | 88.7875 | LICA 09 @ 1.2125 |
| 2 | Adhesive 2 | 10 | 88.7875 | LICA 09 @ 1.2125 |
| 3 | Adhesive 1 | 10 | 88.7875 | LICA 38 @ 1.2125 |
| 4 | Adhesive 2 | 10 | 88.7875 | LICA 38 @ 1.2125 |

Compounding was done on the ZSK 30 mm Twin Screw Extruder (TSE). The initial screw design was designed to minimize heat input yet maximize dispersion (A42723.001). Adhesive material was fed through the 5 gallon pail unloader (platen temp 155.degree. C.: Hose temp 155.degree. C.) Location of adhesive feed was barrel 1 which was hooked up to both heating and cooling. Both the VCI powder and the optical brightener where fed at barrel 4 and delivered through the side-feeder. Atmospheric vents where at both barrels 3 and 7. Barrel temperatures and other parameters are shown in table 2 below.

TABLE 2

| Screw Design A42723.001 | | | |
|---|---|---|---|
| Run# | Barrel Temps ° C. | TSE Rpm | Rate |
| Sav + 10% VCI | 120 | 350 | 30 |
| SAV 11.2125% VCI (T) 38 | 110 | 350 | 30 |
| 1133 11.2125% VCI (T) 38 | 110 | 350 | 30 |
| 1133 11.2125% VCI (T) 09 | 110 | 350 | 30 |

With a longer screw design, it is believed that the titanate could also be added at the time of extrusion. Also additives, such as coloring agent, antibacterial agents, optical brighteners and other property enhancing additives could be added to this blend down stream in the screw.

Figure 12A:
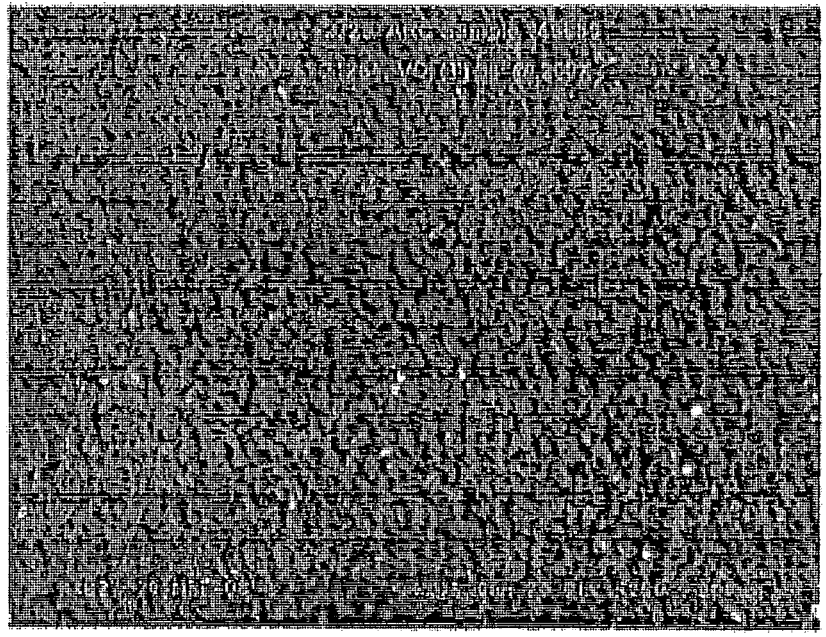
FIG. 12a and FIG. 12b are micrographs showing dispersion of additive in adhesive.
Figure 12B:
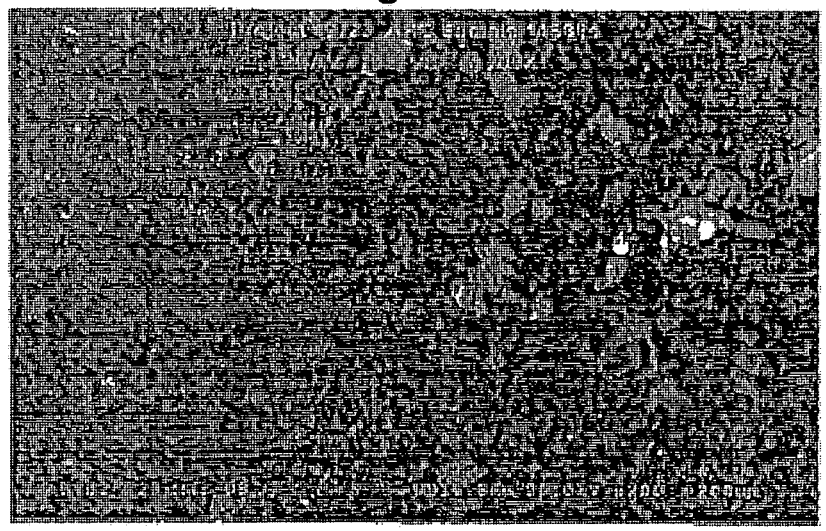

FIG. 12a is a micrograph of the sample SAV 11.2125% VCI(T) 38, showing good dispersion of the VCI particles in the adhesive matrix. FIG. 12b shows poorer dispersion of VCI particles in the non-titanated sample Say+10% VCI. "SAV" and "Say" both indicate Adhesive 2.

The data obtained from the various test laboratories showed that the twin-screw extrusion process, combined with the addition of titanate coupling agents helped couple the VCI powders with the SEBS rubber adhesive. The viscosity levels, especially at lower temperatures, were also improved (lowered) and there was no loss on the VCI effectiveness on corrosion, due to titanate coupling agents.

Example 2

VCI Trial Production #1

Commercial razor blades are placed in a closed Zip-Lock® type bag with a 6 inch by 8 inch rectangle of laminate. The laminate is prepared by adhering a non-woven fabric to a thermoplastic film with an adhesive. In controls, the adhesive contains no VCI. In the test samples, the adhesive contains VCI particles and titanate/zirconate coupling agents as described herein. The blades and laminate are held in the bag for two hours, and then ¼ inch of water is added to the bag. After addition of water, the blades are visually inspected with a 3.times. magnifying glass) on a periodic basis, and the extent and kind of rust are noted over time. In the table, the numbers represent % corrosion, being that fraction of the surface of the razor that is covered with rust at the noted time. The nature of the corrosion (black oxide, gray oxide, or red oxide) is also qualitatively noted.

Sample 1 in the table is an adhesive composition with Adhesive 2 with VCI but no titanate. Samples 2-5 in the table correspond to Formulation 1-4, respectively, in Example 1. The results of the test are reported below. Two controls are noted in the Table as containing just the adhesive (NW1133 or Savare) without any added VCI; another control is provided where the bag contained no laminate at all ("Blank").

TEST RESULTS
(Numbers = % corrosion)

| Sample | 15 min | ½ hr | 1 hr | 2 hr | 4 hr | 8 hr | 17 hr | 24+ hr | Comments |
|---|---|---|---|---|---|---|---|---|---|
| Sample #1 | 0 | 0 | 0 | 15 G | 20 GB | 50 GB | 60 GB | 65 RB | 1&4 = VCI OK |
| Sample #2 | 0 | 0 | 5 G | 20 G | 30 GB | 65 GB | 70 RB | 70 RB | Worst VCI OK |
| Sample #3 | 0 | 0 | 0 | 10 G | 20 G | 40 GB | 55 GB | 65 GB | Rated 2$^{nd}$ Best VCI |
| Sample #4 | 0 | 0 | 2 G | 15 G | 20 GB | 50 GB | 60 GB | 70 RB | 1&4 - VCI OK |
| Sample #5 | 0 | 0 | 0 | 10 G | 15 G | 35 GB | 55 GB | 65 GB | Rated Best VCI |
| Adhesive NW1133 | 0 | 5 G | 40 GB | 70 RB | 100 | 100 | 100 | 100 | No VCI Red Rust 2 Sides |
| Adhesive Savare | 0 | 10 G | 30 GB | 70 RB | 100 | 100 | 100 | 100 | No VCI Red Rust 2 Sides |
| Blank. | 10% | 50 GB | 60 GB | 80 RB | 100 | 100 | 100 | 100 | No VCI Red Rust 2 Sides |

VCI Trial Production #2

This production did not have optical brightener in the compound. Compared to trial production #1 in the Table above, 5% Tackifier resin was added to the adhesive for improved tack at lamination. Development of corrosion is reported as for the Table above.

| | | | | | | | | |
|---|---|---|---|---|---|---|---|---|
| Sample #1 5% Tack | 0 | 0 | 0 | 5 G | 5 GB | 10 GBR | 25 RBR | Best VCI OK |
| Sample #2 | 0 | 0 | 0 | 0 | 5 G | 10 GB | 35 RB | Best VCI OK |
| Control | 0 | 5 G | 40 GB | 60 RB | 100 | 100 | 100 | No VCI Red Rust 2 Sides |
| Blank. | 10% | 25 GB | 50 GB | 70 RB | 100 | 100 | 100 | No VCI Red Rust 2 Sides |

B = Black Oxide
G = Gray Oxide
R = Red Oxide

What is claimed is:

1. A method of manufacturing a corrosion inhibiting hot melt adhesive composition in multiple stages, the method comprising
   in a first stage at a first shear rate, melting an adhesive at a first temperature above 120° C.;
   in a second stage, feeding the adhesive into an extruder on-demand and increasing the shear to a second shear rate and reducing the temperature below 120° C.; and
   in a third stage, adding a vapor corrosion inhibiting powder to the adhesive in the extruder while maintaining a sufficient shear to maintain the temperature below 120° C. while providing melt flow for a sufficient time to disperse the powder in the adhesive, the powder comprising a carrier, a vapor phase corrosion inhibitor, and a coupling agent selected from the group consisting of organotitanates and organozirconates.

2. A method according to claim 1, wherein the adhesive comprises an ABA block copolymer, wherein A is an ethylene homopolymer or copolymer block and B is an ethylene copolymer block different from A.

3. A method according to claim 1, further comprising, in a fourth stage, adding a tackifying resin.

4. A method according to claim 3, comprising operating at a temperature of 125° C. to 150° C. in the first stage.

5. A method according to claim 3, comprising operating at a temperature of 120° C. to 130° C. in the fourth stage.

6. A method according to claim 3, comprising operating at a temperature of 100° C. or less in the third stage.

7. A method according to claim 3, comprising operating at a temperature of 80° C. or less in the third stage.

8. A method according to claim 1, comprising adding the particles and the coupling agents separately in the third stage.

9. A method according to claim 1, comprising applying the coupling agent onto the particles before the particles are added in the third stage.

10. A method according to claim 1, wherein the composition comprises 0.1% to 5% by weight total titanate and zirconate.

11. A method according to claim 1, comprising operating at a temperature of 130° C. to 150° C. in the first stage, at a temperature of 75° C. to 90° C. in the third stage, and at a temperature of 100° C. to 130° C. in the fourth stage.

12. A method according to claim 1, comprising operating at a temperature of less than 105° C. in the third and fourth stage.

13. A process according to claim 1, which is a continuous process.

14. A method of compounding an adhesive composition in an extrusion apparatus, comprising
   melting an adhesive comprising a block copolymer;
   introducing the molten hot melt adhesive into the barrel of the extruder;
   cooling the melt below 90° C. while increasing shear in the barrel to maintain sufficient melt flow;
   adding a titanate coupling agent and/or a zirconate coupling agent to the melt at a temperature of 90° C. or below;
   adding a vapor corrosion inhibitor in particulate form to the melt; and
   blending the hot melt adhesive, VCI, and titanate and/or zirconate coupling agent at 90° C. or less until the particles are dispersed in the hot melt adhesive.

15. A method according to claim 14, wherein the block copolymer has blocks produced by copolymerizing ethylene and at least one copolymerizable monomer.

16. A method according to claim 15, wherein the adhesive is an olefin block copolymer with a polydispersity of 1.0 to 2.9.

17. A method according to claim 14, comprising adding the titanate or zirconate coupling agent to the melt at a temperature of 50° C. to 80° C. and blending the hot melt adhesive, VCI, and titanate or zirconate coupling agent at a temperature of 50° C. to 80° C.

18. A method according to claim 14, comprising melting the hot melt adhesive at a temperature of 120° C. to 160° C.

19. A method according to claim 14, further comprising, after the particles are dispersed in the hot melt adhesive, continuing to apply shear at a temperature of 80° C. to 130° C. and adding a tackifying agent.

20. A method according to claim 14, wherein the coupling agent is added at a level to provide a total level of titanium and/or zirconium of 0.1% to 5% by weight in the finished adhesive composition.

21. A method according to claim 14, wherein the coupling agent and the VCI are added separately to a twin screw extruder.

22. A method according to claim 14, wherein the coupling agent and the VCI are added together to the twin screw extruder.

23. A method according to claim 14, comprising combining the VCI and the coupling agent and adding the combination to the melt at a temperature below 90° C.

* * * * *